US010823981B2

(12) United States Patent
Stevens et al.

(10) Patent No.: US 10,823,981 B2
(45) Date of Patent: Nov. 3, 2020

(54) DEFORMABLE NON-ROUND MEMBRANE ASSEMBLIES

(71) Applicant: Adlens Limited, Eynsham (GB)

(72) Inventors: Robert Edward Stevens, Oxford (GB); Alex Edginton, Oxford (GB); Benjamin Thomas Tristram Holland, Oxford (GB); Daniel Paul Rhodes, Oxford (GB); Dijon Pietropinto, Oxford (GB); Derek Paul Forbes Bean, Oxford (GB); Roger Brian Minchin Clarke, Melbourn (GB); Peter Lee Crossley, Melbourn (GB); Richard Leefe Douglas Murray, Melbourn (GB); Edwin James Stone, Melbourn (GB)

(73) Assignee: ADLENS LTD., Eynsham (GB)

( * ) Notice: Subject to any disclaimer, the term of this patent is extended or adjusted under 35 U.S.C. 154(b) by 0 days.

(21) Appl. No.: 16/583,127

(22) Filed: Sep. 25, 2019

(65) Prior Publication Data
US 2020/0089024 A1 Mar. 19, 2020

Related U.S. Application Data

(60) Continuation of application No. 15/784,626, filed on Oct. 16, 2017, now abandoned, which is a
(Continued)

(30) Foreign Application Priority Data
Mar. 27, 2012 (GB) .................................. 1205394.8

(51) Int. Cl.
*G02B 3/14* (2006.01)
*G02C 7/08* (2006.01)

(52) U.S. Cl.
CPC ............... *G02C 7/085* (2013.01); *G02B 3/14* (2013.01)

(58) Field of Classification Search
CPC ........ G02B 3/14; G02B 27/0176; G02B 3/12; G02C 7/041; G02C 7/085
(Continued)

(56) References Cited

U.S. PATENT DOCUMENTS

| 1,269,422 A | 6/1918 | Gordon |
| 2,576,581 A | 11/1951 | Edwards |

(Continued)

FOREIGN PATENT DOCUMENTS

| CN | 1146243 A | 3/1997 |
| CN | 1191608 A | 8/1998 |

(Continued)

OTHER PUBLICATIONS

Lub, et al. (2016) "Inhibiting the anaphase promoting complex/cyclosome induces a metaphase arrest and cell death in multiple myeloma cells", Oncotarget. 7(4):4062-4076.
(Continued)

*Primary Examiner* — Hung X Dang
(74) *Attorney, Agent, or Firm* — Rothwell, Figg, Ernst & Manbeck, P.C.

(57) ABSTRACT

A deformable membrane assembly comprises an at least partially flexible fluid-filled envelope, one wall of which is formed by an elastic membrane that is held around its edge by a resiliently bendable supporting ring, a fixed support for the envelope and selectively operable means for causing relative movement between the supporting ring and the support for adjusting the pressure of the fluid in the envelope, thereby to cause the membrane to deform. The bending stiffness of the ring varies round the ring such that upon deformation of the membrane the ring bends variably to
(Continued)

control the shape of the membrane to a predefined form. The moving means comprise a plurality of ring-engaging members that are arranged to apply a force to the ring at spaced control points. There are at least three control points, and there is a control point at or proximate each point on the ring where the profile of the ring that is needed to produce the predefined form upon deformation of the membrane exhibits a turning point in the direction of the force applied at the control point between two adjacent points where the profile of the ring exhibits an inflection point or a turning point in the opposite direction.

14 Claims, 15 Drawing Sheets

Related U.S. Application Data continuation of application No. 15/617,563, filed on Jun. 8, 2017, now Pat. No. 9,791,720, which is a division of application No. 14/388,741, filed as application No. PCT/GB2012/051426 on Jun. 20, 2012, now Pat. No. 9,709,824.

(58) Field of Classification Search
USPC ............ 351/159.04, 159.68, 159.01, 159.34; 359/666, 665
See application file for complete search history.

(56) References Cited

U.S. PATENT DOCUMENTS

| | | | |
|---|---|---|---|
| 3,161,718 A | 12/1964 | De Luca | |
| 3,614,215 A | 10/1971 | Mackta | |
| 5,138,494 A | 8/1992 | Kurtin | |
| 5,371,629 A | 12/1994 | Kurtin et al. | |
| 5,526,067 A | 6/1996 | Cronin et al. | |
| 5,956,183 A | 9/1999 | Epstein et al. | |
| 5,999,328 A | 12/1999 | Kurtin et al. | |
| 6,618,208 B1 | 9/2003 | Silver | |
| 6,715,876 B2 | 4/2004 | Floyd | |
| 8,353,593 B2* | 1/2013 | Senatore | G02C 5/001 351/158 |
| 8,708,486 B2 | 4/2014 | Senatore et al. | |
| 9,709,824 B2 | 7/2017 | Stevens et al. | |
| 9,791,720 B2 | 10/2017 | Stevens et al. | |

| | | |
|---|---|---|
| 2003/0007236 A1 | 1/2003 | Schachar et al. |
| 2003/0095336 A1 | 5/2003 | Floyd |
| 2008/0007689 A1 | 1/2008 | Silver |
| 2010/0020285 A1 | 1/2010 | Berge |
| 2010/0182703 A1 | 7/2010 | Bolis |
| 2011/0085131 A1 | 4/2011 | Gupta et al. |
| 2011/0085243 A1 | 4/2011 | Gupta et al. |
| 2011/0299030 A1 | 12/2011 | Yamauchi |
| 2012/0275030 A1 | 11/2012 | Kong et al. |

FOREIGN PATENT DOCUMENTS

| | | |
|---|---|---|
| CN | 1300372 A | 6/2001 |
| CN | 101517452 A | 8/2009 |
| CN | 101632030 A | 1/2010 |
| CN | 102947730 A | 2/2013 |
| GB | 571912 A | 9/1945 |
| GB | 2353606 A | 2/2001 |
| JP | H11505335 A | 5/1999 |
| JP | 2000-508645 A | 7/2000 |
| JP | 2002517013 A | 6/2002 |
| JP | 2005-518419 A | 6/2005 |
| JP | 2009503826 A | 1/2009 |
| JP | 2010533886 A | 10/2010 |
| JP | 2011516925 A | 5/2011 |
| JP | 2012-528813 A | 11/2012 |
| WO | 91/17463 A1 | 11/1991 |
| WO | 95/27912 | 11/1991 |
| WO | 96/38744 | 12/1996 |
| WO | 9811458 A1 | 3/1998 |
| WO | 99/61940 A1 | 12/1999 |
| WO | 2007/017089 A1 | 2/2007 |
| WO | 2009/010559 A1 | 1/2009 |
| WO | 2011/039365 A1 | 4/2011 |
| WO | 2011/046956 A1 | 4/2011 |
| WO | 2011046959 A1 | 4/2011 |
| WO | 2012/028688 A1 | 3/2012 |
| WO | 2013144533 A1 | 10/2013 |

OTHER PUBLICATIONS

International Preliminary Report on Patentability issued in corresponding International Application No. PCT/GB2012/051426, dated Oct. 1, 2014, 13 pages.

International Search Report and Written Opinion of the International Searching Authority issued in corrresponding International Application No. PCT/GB2012/051426, dated Sep. 27, 1014, 18 pages.

* cited by examiner

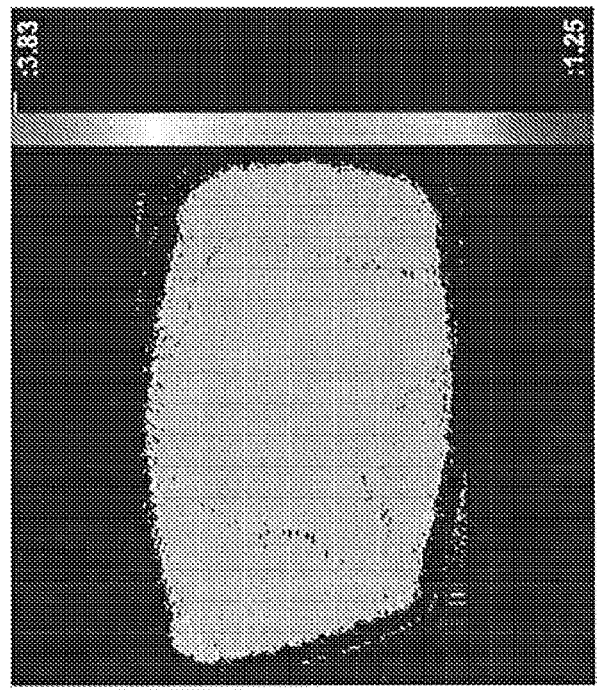
FIG. 17
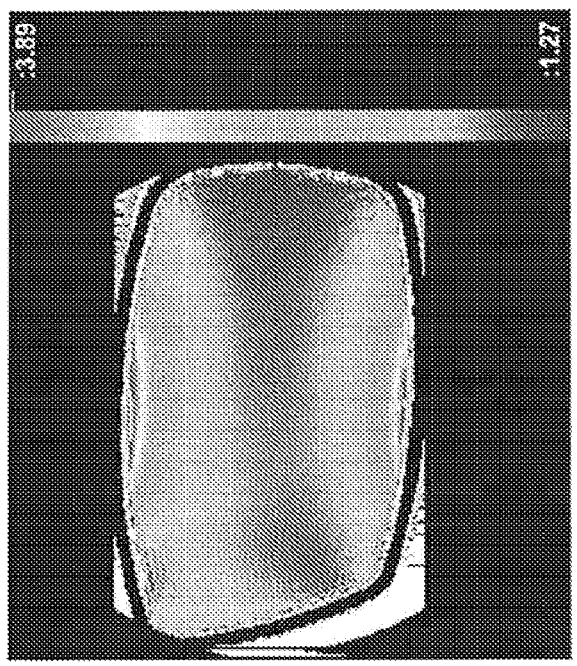
FIG. 18

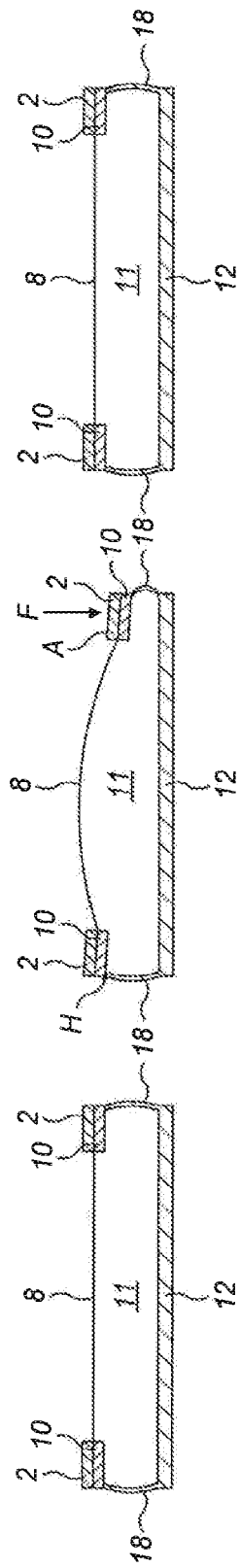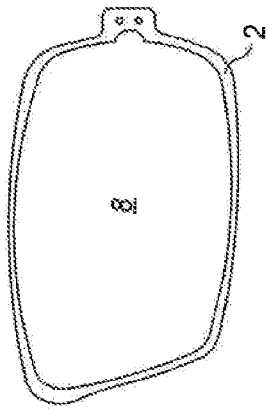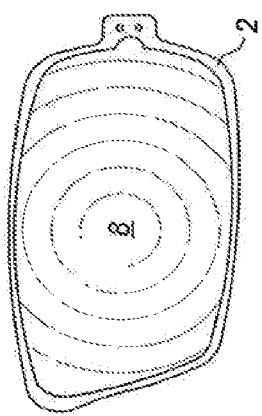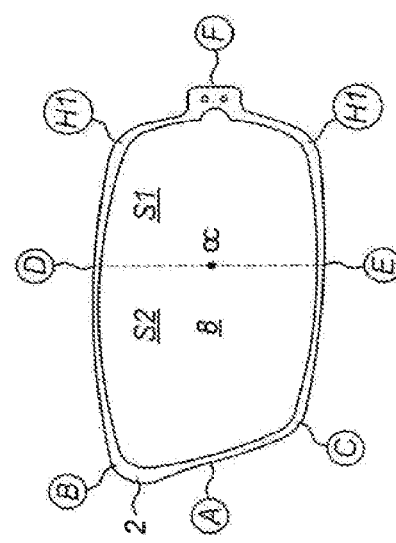

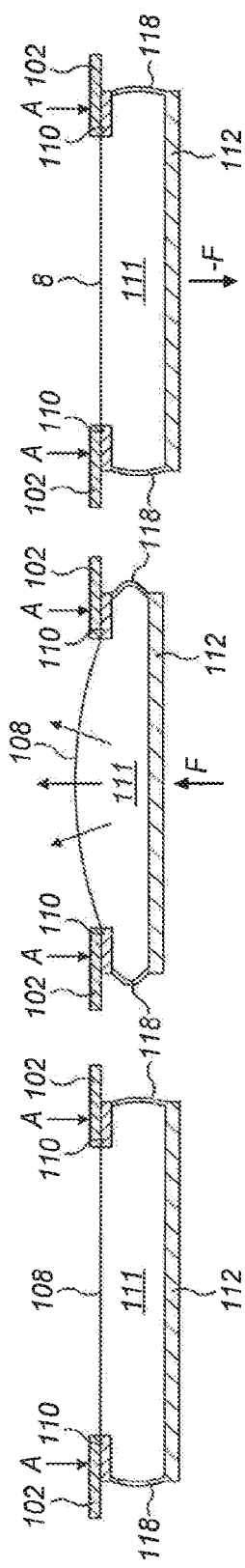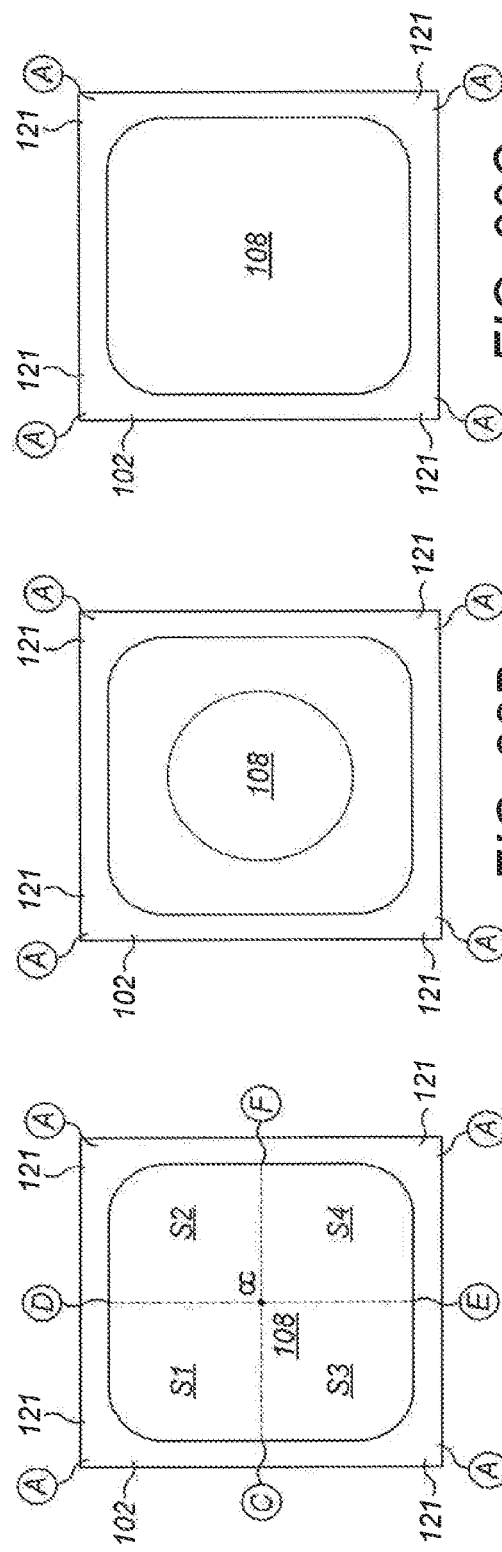

DEFORMABLE NON-ROUND MEMBRANE ASSEMBLIES

CROSS-REFERENCE TO RELATED APPLICATIONS

This application is a continuation of and claims priority under 35 U.S.C. § 120 to U.S. application Ser. No. 15/784,626, filed Oct. 16, 2017, now abandoned, which is a continuation of and claims priority under 35 U.S.C. § 120 to U.S. application Ser. No. 15/617,563, filed Jun. 8, 2017, now U.S. Pat. No. 9,791,720, which is a divisional of and claims priority under 35 U.S.C. § 120 to U.S. application Ser. No. 14/388,741 filed on Jun. 9, 2015, now U.S. Pat. No. 9,709,844, which is a national stage application, filed under 35 U.S.C. § 371, of International Application No. PCT/GB2012/051426, filed on Jun. 20, 2012, which claims priority to, and benefit of Great Britain Application No. 1205394.8, filed on Mar. 27, 2012, each of which is herein incorporated by reference in its entirety.

The present invention provides improvements in or relating to deformable non-round membrane assemblies in which the shape of a membrane is controllably adjustable by altering the fluid pressure across the membrane. The invention has particular reference to assemblies in which the membrane is selectively deformable spherically or according to another Zernike polynomial. In some embodiments the assembly may be a variable optical power fluid-filled lens in which the membrane is transparent and forms one optical surface of the lens whose curvature can be adjusted over substantially the entire lens with minimal optical distortion that would otherwise be caused by the non-round character of the lens. In other embodiments, the membrane may be mirrored and/or opaque. Other applications of the membrane assembly include acoustic transducers and the like.

Variable focus fluid-filled lenses are known in the art. Such lenses generally comprise a fluid-filled transparent envelope, the opposite optical surfaces of the lens being formed by two spaced opposing walls of the envelope, at least one of which walls comprises a flexible transparent membrane. For example, U.S. Pat. No. 1,269,422 discloses a lens with spaced opposed walls of arcuate formation that are merged together at their circumferential edges and which may be adjusted towards or away from each other, and a liquid body between the walls. The pressure of the fluid within the envelope is adjustable to change the degree of curvature of the membrane, thereby adjusting the power of the lens. In some examples, the volume of the envelope may be adjusted, as in U.S. Pat. No. 1,269,422 or WO 99/061940 A1. Alternatively the amount of fluid within the envelope may be adjusted, as in U.S. Pat. Nos. 2,576,581, 3,161,718 and 3,614,215. In either case, an increase in the fluid pressure within the envelope causes deformation of the flexible membrane.

Whilst various applications of adjustable lenses are possible—for example in cameras and other optical equipment—, one use is in eyewear. An adjustable lens is particularly useful for correction of presbyopia—a condition in which the eye exhibits a progressively diminished ability to focus on close objects with age. An adjustable lens is advantageous because the wearer can obtain correct vision through a range of distances from long-distance to near vision. This is more ergonomic than bifocal lenses in which near-vision correction is provided in a bottom region of the lens, thereby only allowing the user to see close objects in focus when looking downwardly.

A disadvantage of the fluid-filled lenses disclosed by the documents mentioned above is that they need to be circular, or at least substantially circular, with a rigid boundary, in order to maintain the membrane spherical; otherwise unwanted optical distortion occurs. However, circular is not a preferred shape for certain applications, including eyewear, because it is not considered to be aesthetically appealing for those applications. Round lenses may also be unsuitable or unpractical for certain applications, such as in optical instruments.

It is desirable therefore to provide an adjustable non-round lens, in which the lens is not distorted as the optical power of the lens is increased.

U.S. Pat. No. 5,371,629 discloses a non-circular variable focal length lens which includes a rigid lens to provide the wearer's distance correction, and a liquid-filled lens bounded by a distensible stretched elastomeric membrane to provide a variable near addition. The liquid, which has a fixed volume, is stored in the field of view between the elastic membrane and the rigid lens. Variation of the optical power of the liquid-filled lens is achieved by displacement of the membrane support to which the outer periphery of the stretched elastomeric membrane is attached. U.S. Pat. No. 5,371,629 claims that the shape of the distended membrane is substantially spherical, despite the circumference of the membrane being non-circular, by allowing the membrane support to bend in a predetermined controlled manner as it is moved. Specifically, the thickness of the membrane support varies around the circumference of the membrane support. U.S. Pat. No. 5,371,629 asserts that by properly proportioning the moment of inertia of the section of the membrane support around its circumference, the shape of the membrane support, when deflected, can be made such as to result in a substantially spherical membrane, despite the fact that the free membrane shape is not circular. The configuration of the membrane support required to result in the desired deformation for any particular lens can be calculated using the method of finite element analysis or in other ways. However, the liquid-filled lens of U.S. Pat. No. 5,371,629 is unpractical for various reasons and was never commercialised. In particular, despite its teachings, U.S. Pat. No. 5,371,629 fails to disclose a liquid-filled lens that avoids unwanted distortion when the membrane is distended, and the degree of distortion encountered in the liquid-filled lens of U.S. Pat. No. 5,371,629 renders the lens unusable.

WO 95/27912 A1 proposes a workaround that comprehends the use of a non-round membrane supporting ring having a circular central opening, but this does not provide a true non-round lens and is a cumbersome arrangement that is also sub-optimal from an aesthetic point of view.

Similarly, it is desirable to be able to adjust controllably the shape of a membrane for other non-optical applications. For example, a surface of controllably variable sphericity or some other Zernike polynomial would be useful in the field of acoustics for the creation of non-round transducers, such as loudspeakers. Many products would benefit from non-round drivers owing to space constraints and the typical geometry of the product, e.g. televisions, mobile phones. Maintaining the sphericity of a membrane of variable curvature would be beneficial in the production of drivers, since spherical deformation would ensure the emitted waves behave as though they originated from a point source, thereby avoiding interference patterns in the emitted pressure waves. However, the unmodified deformed shape of a non-round membrane that is held at its edges is not spherical. Hence providing a selectively adjustable non-round surface would be desirable for in the performance of non-round drivers for acoustic use.

In one aspect of the present invention therefore there is provided a deformable membrane assembly as claimed in claim 1 below.

The present inventors have realised that in a deformable membrane assembly such, for example, as a fluid-filled lens in which the flexible envelope contains a fixed volume of fluid and the membrane is distended to adopt a predefined form by adjusting the volume of the envelope, to alter the pressure of the fluid therein, the control points where the force is applied to the membrane supporting ring for adjusting the envelope volume must be carefully positioned. By controlling carefully the control points at which the force is applied to the membrane supporting ring and allowing the membrane supporting ring to bend freely between the control points, semi-active control over the shape of the membrane is achieved. The bending stiffness of the supporting ring varies around the ring so that when actuated the ring conforms to the desired profile to produce a membrane shape of the predefined form. Suitably the bending stiffness may be varied round the ring by varying the second moment of area of the ring.

The means for causing relative movement between the supporting ring and the support for the envelope for adjusting the volume of the envelope may comprise means for moving the supporting ring or support. Said moving means may be configured for compressing the envelope to reduce its volume, thereby to increase the pressure of the fluid within the envelope and to cause the membrane to distend outwards relative to the envelope in a convex manner. Thus in some embodiments the moving means may be configured for compressing the envelope in a first direction against the support to increase the pressure of the fluid therein to cause the membrane to distend outwardly in a second opposite direction.

In another aspect of the present invention therefore there is provided a deformable membrane assembly as claimed in claim 6 below.

Alternatively the means for moving the supporting ring or support for adjusting the volume of the envelope may be configured for expanding the envelope to increase its volume, thereby to reduce the pressure of the fluid within the envelope and to cause the membrane to distend inwards in a concave manner.

The means for moving the supporting ring or support for adjusting the envelope volume may suitably comprise a selectively operable device comprising one or more components arranged to act between the membrane supporting ring and the support to move the supporting ring and/or the support, the one relative to the other, to adjust the volume of the envelope.

Suitably the flexible envelope may comprise the one wall defined by the membrane and another opposing rear wall that is joined to the edge of the membrane in such a manner as to close and seal the envelope. In some embodiments, the opposing walls may be joined directly to one another. Alternatively the envelope may comprise a peripheral side wall intermediate the two opposing walls. The side wall may be flexible to allow the opposing walls to be moved towards or away from each other for adjusting the volume of the envelope. The rear wall may be rigid or substantially rigid or may be supported stably at least round a peripheral edge.

The means for moving the supporting ring or support may be configured to act between the membrane supporting ring and the rear wall. In some embodiments, the rear wall may form part of the support for the envelope, in that the rear wall may afford a stable part for the adjusting means to react against.

The invention is especially applicable to non-round membranes in which the edge of the membrane is planar in the un-actuated state and deviates from the planar when the assembly is actuated. However the invention is equally applicable to round membranes where, by dint of the shape of the predefined form, the edge of the membrane similarly deviates from the planar when the assembly is actuated. In particular the invention is also concerned with round membranes where the predefined form is non-spherical.

To produce the predefined membrane form when actuated, the supporting ring must adopt an actuated profile in which one or more regions of the ring are displaced in one direction away from a planar datum defined by the ring in the un-actuated state and/or one or more regions must be displaced from the planar datum in another opposite direction. To achieve the desired actuated profile a force is applied to the supporting ring at each control point. The inventors have realised that there should be at least one control point within each sector of the supporting ring, whereby a "sector" is meant a portion of the ring lying between two adjacent inflection points or minimal points in the profile, said minimal points being local minimums of displacement of the ring in the direction of the force applied at the control point, e.g. in the first direction inwards relative to the envelope, when the membrane is deformed. Since a minimal point is defined as being a local rather than a global minimum in the direction of the applied force at the adjacent control points (and thus a local rather than a global maximum in the direction opposite to the direction of the applied force, e.g. in the second direction outwards relative to the envelope) it will be understood that at these points the ring may actually be displaced in either direction, or not displaced at all, from the planar datum. In general the ring may at all points move in either direction from, or remain stationary at, the planar datum, depending on the perimeter shape, surface profile and actuation required. In some embodiments where forces having opposite directions are applied at adjacent control points to achieve a desired ring profile when the membrane is deformed, a control point may be positioned between two inflection points in the profile of the supporting ring. However the forces applied at the control points will usually all be in the same direction, such that a sector of the ring is defined between adjacent local minima as described above.

In some embodiments, the ring may be non-round and the predefined form may have a centre. In such embodiments, the minimal points of minimal displacement may also be minimal points in the sense that the distance between the supporting ring and the centre of the predefined form of the membrane when distended is a local minimum. It will be understood that the position of the centre will depend on the shape of the predefined form. In some embodiments the centre may be at or close to the geometric centre of the membrane. Alternatively the centre of the predefined form may be at a different location from the geometric centre of the membrane. Typically, when deformed, the membrane will have a vertex (i.e. a point of global maximum displacement) and the centre may be located at the vertex. This is particularly the case in optical applications where the membrane forms an optical surface of the lens. Generally the centre of the defined form will be positioned somewhere within the body of the membrane away from the supporting ring.

In practice, according to the shape of the membrane, some regions of the ring may be supported to reduce the flexibility of the ring in those regions. Accordingly, the inventors have realised that there should be at least one control point within each sector of the ring between unsupported minimal points. It will be appreciated that the number of such minimal points will depend upon the shape of the ring. In some embodiments, the number of minimal points may be determined by the number of corners of the ring. For instance, a quadrilateral ring with four corners has four minimal points generally equidistant between the corners where the centre of the predefined form of the membrane is at or towards the geometric centre of the quadrilateral. In practice, the centre may be positioned asymmetrically between opposite sides, and such an arrangement may be particularly suitable for a rectangular optical lens. In some embodiments, in a quadrilateral shaped ring, the centre of the defined form may be positioned generally symmetrically between one pair of opposite sides and asymmetrically between the other pair of opposite sides.

In a generally rectangular ring with two long sides and two short sides there will normally be four such minimal points where displacement of the ring from the planar datum in the direction opposite to the direction of the force applied to the supporting ring at the adjacent control points is a local maximum, one on each of the sides between two adjacent corners, but in some embodiments, especially where the short sides are substantially shorter than the long sides, the short sides of the ring may be reinforced to reduce their flexibility, so that in practice the ring along each short side does not bend substantially as the membrane is distended, in which case there are only two unsupported minimal points along the two long sides. In such a rectangular ring, for optical applications, the centre of the defined form may be positioned further from one short side than from the other.

The inventors have also realised that there should be at least three control points, regardless of the number of minimal points and sectors in order to define the plane of the membrane.

Further, the inventors have realised that within each sector, a control point should be positioned at or close to a maximal point where the displacement of the ring in the actuated state away from the planar datum in the direction of the force applied at the control point in that sector is a local maximum, e.g. in the first direction inwards relative to the envelope to achieve compression of the envelope. It will be understood that where the rest of the ring within a given sector is displaced in the opposite direction when actuated, e.g. in the second direction outwardly relative to the envelope, the maximal point within that region may be a point at which the ring is stationary, i.e. is subject to no or substantially no displacement away from the planar datum. Further, a maximal point may be a point at which the ring is actually displaced in the opposite direction from the planar datum, e.g., outwardly relative to the envelope, less far than the rest of the ring within the same sector. In other words a point of locally maximal displacement in the direction of the force applied at the control point is equivalent to a point of local minimum displacement from the planar datum in the opposite direction.

In embodiments where the ring is non-round and the predefined form has a centre, a maximal point may be a point on the ring between adjacent inflection or minimal points where the distance between the ring and the centre of the predefined form of the membrane when distended is a maximum. If this were not the case then within a sector there would be a portion of the ring that was further away from the centre than the control point(s) within the sector and which would therefore be uncontrolled, leading potentially to unwanted distortion and shape of the membrane when distended.

In some embodiments, one or more of said control points may be actuation points, where the ring-engaging members are configured actively to displace the supporting ring relative to the support. Said supporting ring may be formed with a protruding tab at the or at least one of the actuation points for engaging the ring with the ring engaging element.

The membrane may be continuously adjustable between an un-actuated state and fully distended state. The supporting ring may be planar when un-actuated.

At each position between the un-actuated and fully distended states the supporting ring may be displaced at the or each actuation point by the distance required to achieve the profile required to produce the predefined form of the membrane. This is important so that at each position between the un-actuated and fully distended states, the ring is positioned at the or each actuation point at its desired location within the overall desired profile of the ring. It will be understood that if the actuation point were to be held in a different position by the ring engaging member at that point then local distortion in the desired profile of the ring would occur at that point leading potentially to unwanted distortion in the shape of the membrane.

In some embodiments, one or more of said control points may be hinge points, where the ring-engaging members are configured to hold the supporting ring stationary relative to the support. The supporting ring is required to remain stationary at the or each hinge point to achieve the required actuated ring profile to produce the predefined form of the membrane at each position between the un-actuated and fully distended states. Thus, in the same way as the actuation points, the ring must be held at each hinge point by the ring-engaging member at that point in a position that corresponds to the desired overall profile of the ring at each state of the ring between the un-actuated and fully distended states. Since the ring is not displaced at each hinge point, it follows that the position of the ring at each hinge point must be the same for each state of the ring between the un-actuated and fully distended states. Where the predefined form has a centre, there may be a plurality of hinge points that are substantially equidistant from the centre of the predefined form.

In some embodiments two adjacent hinge points may define a tilting axis, in which case there is suitably at least one actuation point where the ring engaging member is configured actively to displace the supporting ring relative to the support for tilting the ring relative to the support about said tilting axis in the first direction, for compressing or the second direction for expanding the envelope.

For some applications, the supporting ring may be generally rectangular, having two short sides and two long sides. In such cases, at least one actuation point may be located on one of the short sides, and two adjacent hinge points may be located on or proximate to the other short side. The predefined form may have a centre which may be located off-centre with respect to the membrane, being closer to the other short side than it is to the one short side. The one short side may generally follow the arc of a circle that is centred on the centre of the defined form. The at least one actuation point may be located substantially centrally on said one short side.

The supporting ring should be free to bend passively relative to the support intermediate the control points. However, in some embodiments it may be desirable to control the bending of the ring by means of stiffening elements for stiffening one or more regions of the supporting ring.

Advantageously the supporting ring may comprise two or more ring elements, and the membrane may be sandwiched between two adjacent ring elements.

According to another aspect of the present invention therefore there is provided a deformable membrane assembly comprising: an at least partially flexible fluid-filled envelope, one wall of which is formed by a distensible membrane that is held around its edge by a resiliently bendable supporting ring, and selectively operable means for adjusting the pressure of fluid in the envelope to cause the membrane to deform; wherein the bending stiffness of the ring varies round the ring such that upon deformation of the membrane, the ring bends variably to control the shape of the membrane to a predefined form; characterised in that the ring comprises a plurality of ring elements, and the membrane is sandwiched between two adjacent ring elements.

Suitably, the membrane may be pre-tensioned on the membrane supporting ring. The inventors have realised that by sandwiching the membrane between two adjacent ring elements, the torsional forces applied by the membrane to the ring can be balanced out resulting in no or substantially no net torsional force. It will be appreciated that it is desirable to avoid torsional forces on the ring which might lead to unwanted distortion in the shape of the ring and thus in the shape of the membrane when distended. Thus, in some embodiments, the membrane supporting ring may consist of two ring elements. In some embodiments more than two ring elements may be provided. However, the arrangement should be such that when the membrane is pre-tensioned between the two adjacent ring elements, the torsional forces on the ring elements above and below the membrane cancel each other out or substantially cancel each other out.

The means for adjusting the pressure within the envelope may comprise a selectively operable device comprising one or more components arranged to adjust the fluid pressure in the envelope. In some embodiments, the means for adjusting the pressure of a fixed volume of fluid within the membrane may comprise means for compressing or expanding the envelope as mentioned above. Suitably, a fixed support may be provided, and means may be provided for compressing or expanding the envelope against the support to increase or decrease the pressure of the fluid therein.

Suitably the supporting ring may have a substantially uniform depth and a variable width to control the second moment of area round the ring and thus the bending stiffness of the ring. Typically the supporting ring may be narrowest where it is required to bend the most to achieve the predefined form when the membrane is distended.

In some embodiments the predefined membrane shape may be spherical or another form defined by one or more Zernike polynomials. These have the general formula $Z_n^{\pm m}$. Various shapes, as defined by Zernike functions or combinations of more than one such function, are possible using the lens assembly of the present invention. A priority for ophthalmic applications, for instance, is to be able to achieve vision correction with a linear superposition of $Z_2^{\pm 2}$ (astigmatism) and $Z_2^{0}$ (sphere for distance correction). Opticians typically prescribe lenses based on these formulae. Higher order surfaces with additional components $Z_j^{\pm j}$ are also possible if additional control points are provided on the edge of the membrane, where j scales in similar magnitude to the number of control points. Higher order surfaces with components $Z_j^{\pm k}$ ($k \leq j$) may also be possible where the shape of the membrane edge permits.

Further, various linear superpositions of scaled Zernike polynomials of the form $Z_n^{\pm m}$ are possible:

$$Z_2^{\pm 2}, Z_2^{0}, Z_j^{\pm j}, Z_j^{\pm k} (k \leq j)$$

In general, except at their periphery, surfaces achievable by deforming a membrane with pressure may have one or more local maxima or one or more local minima, but not both, in addition to saddle points. The shapes that are achievable are necessarily limited by the shape of the periphery, which is stable in use.

Suitably, the required bending stiffness round the ring may be determined by finite element analysis (FEA). In particular, FEA may be used to calculate the required variation in bending stiffness round the ring for the ring to adopt the desired profile when actuated in order to produce a membrane shape of the predefined form. For quasi-static or low frequency optical and other applications, static FEA should be employed adequately. However, where the surface is intended for acoustic applications, dynamic FEA may be appropriate. FEA—whether static or dynamic—involves numerous iterations performed using a computer with the input of selected parameters to calculate the membrane shape that would result in practice with an increasing force applied at the control points. The element shape may be selected to suit the calculation being performed. The selected parameters to be input may include the geometry of the supporting ring, the geometry of the membrane, the modulus of the membrane, the modulus of the ring, including how the modulus of the ring varies round the ring (which may be defined empirically or by means of a suitable formula), the amount of pre-tension in any of the parts, the temperature and other environmental factors. The FEA programme may define how the pressure applied to the membrane increases as load is applied to the rings at the control points.

Within each iteration of the FEA the calculated shape of the membrane is compared with the predefined form, and any deviation between the calculated shape the predefined form used to adjust the bending stiffness round the membrane supporting ring for the next iteration. Progressively, the bending stiffness of the supporting ring is adjusted so that the calculated shape of the membrane converges with the desired predefined form.

A reinforcing diaphragm may be provided that is fastened to the supporting ring, which diaphragm has a greater stiffness in the plane of the ring than in the direction of bending of the ring.

In yet another aspect of the present invention therefore there is provided a deformable membrane assembly comprising: an at least partially flexible fluid-filled envelope, one wall of which is formed by an elastic membrane that is held around its edge by a resiliently bendable supporting ring, and selectively operable means for adjusting the pressure of the fluid within the envelope to cause the membrane to deform; wherein the ring is planar when un-actuated and has a bending stiffness that varies round the ring such that upon deformation of the membrane the ring bends variably to control the shape of the membrane to a predefined form; characterised in that the membrane is pre-tensioned on the supporting ring, and a reinforcing diaphragm is provided that is bonded to the supporting ring and has a greater stiffness in the plane of the ring than in the direction of bending of the ring.

As mentioned above, the membrane is suitably pre-tensioned on the membrane supporting ring. The reinforcing diaphragm serves to stiffen the ring in the plane of the membrane in the un-actuated state against the additional loading that is created by the pre-tensioning within the membrane, while allowing the ring to bend freely in the direction normal to the ring. Alternatively the supporting ring itself may have a greater bending stiffness in the plane of the membrane in the un-actuated state than out of the plane of the membrane.

Suitably, the reinforcing diaphragm may be fastened to the supporting ring uniformly round the ring so that the tension in the membrane is transmitted uniformly to the diaphragm.

In some embodiments, in the plane of ring, the membrane may be longer in one dimension than it is in another dimension. In such cases, the reinforcing diaphragm may have a lower stiffness in the one dimension than it has in the other dimension. Alternatively the geometry of the assembly may itself serve to may be used to compensate for the consequent differential strain in the membrane.

The means for adjusting the pressure within the envelope may comprise a selectively operable device comprising one or more components arranged to increase or decrease the fluid pressure in the envelope. Typically the means for adjusting the pressure within the fluid-filled envelope, which may contain a fixed volume of fluid, may comprise means for compressing or expanding the envelope. The fluid-filled compressible envelope may comprise an at least partially rigid rear wall that is spaced from the distensible membrane and a flexible side wall between the membrane and the rear wall.

In some embodiments, the membrane, rear wall and fluid are transparent such that the membrane and rear wall form an adjustable optical lens. Where provided, the reinforcing diaphragm may also be transparent.

Suitably said rear wall may be shaped to provide a fixed lens.

The assembly may further comprise a protective rigid front cover over the membrane. The front cover may be transparent. Suitably the front cover may be shaped to provide a fixed lens.

Thus, in some embodiments, the front cover and/or rear cover may provide a fixed optical power for the correction of refractive errors such as myopia and hyperopia. The adjustable optical lens of the invention may be used to provide an additive (or subtractive) optical power to the fixed optical power of the front or rear lens for the correction of presbyopia. Suitably the front and/or rear lenses may be shaped for the correction of astigmatism, and similarly the predefined form of the distended membrane of the adjustable optical lens of the invention may be adapted for the correction of astigmatism.

In some embodiments the envelope may be housed within a retaining ring.

In yet another aspect of the present invention there is provided an article of eyewear comprising a deformable membrane assembly in accordance with the invention.

Said article of eyewear may typically comprise a frame with a rim portion; the deformable membrane assembly may be mounted within the rim portion.

Following is a description by way of example only with reference to the accompanying drawings of embodiments of the present invention.

In the drawings:

FIG. 17 shows the variation in the optical power as calculated by FEA of a lens assembly in an actuated state that is similar to the first lens assembly but omits the reinforcing diaphragm;

FIG. 18 shows the variation in the optical power as calculated by FEA of the first lens assembly of the invention;

Figure 23:
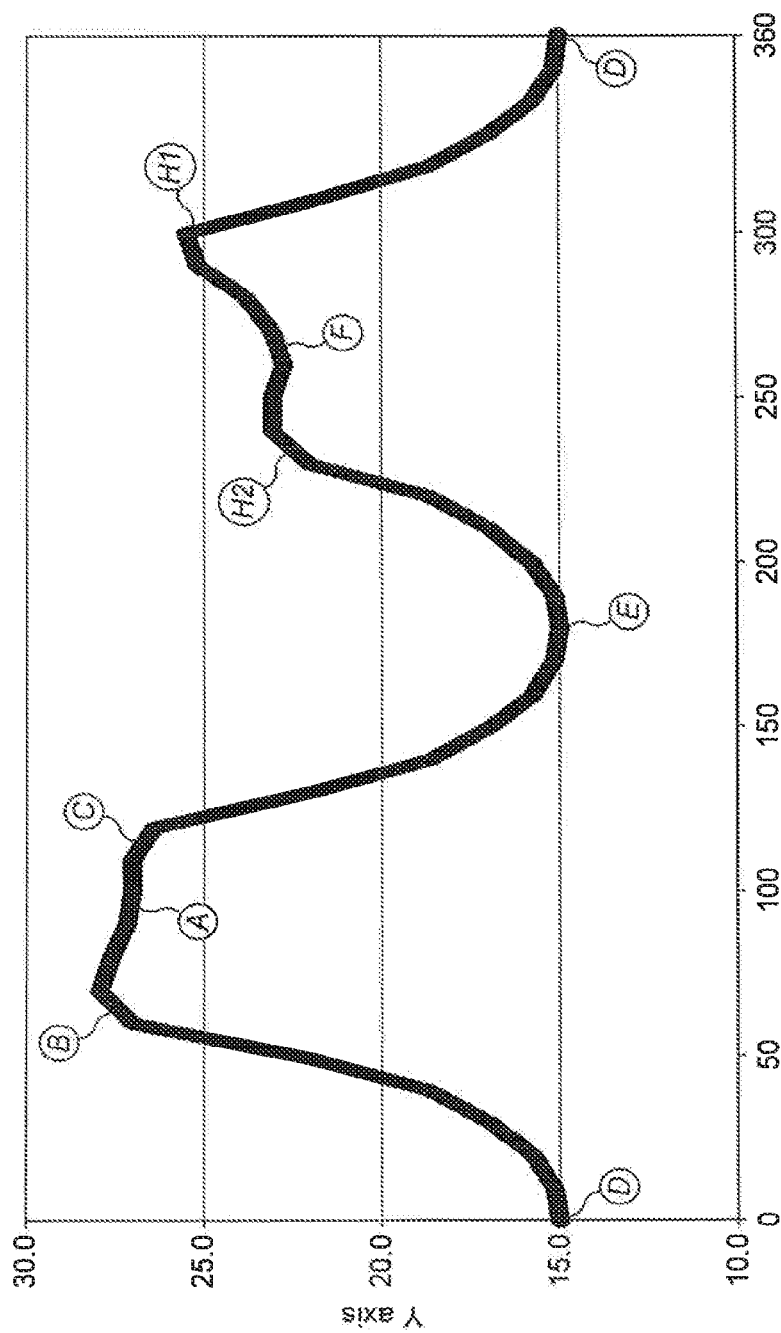
Figure 24:
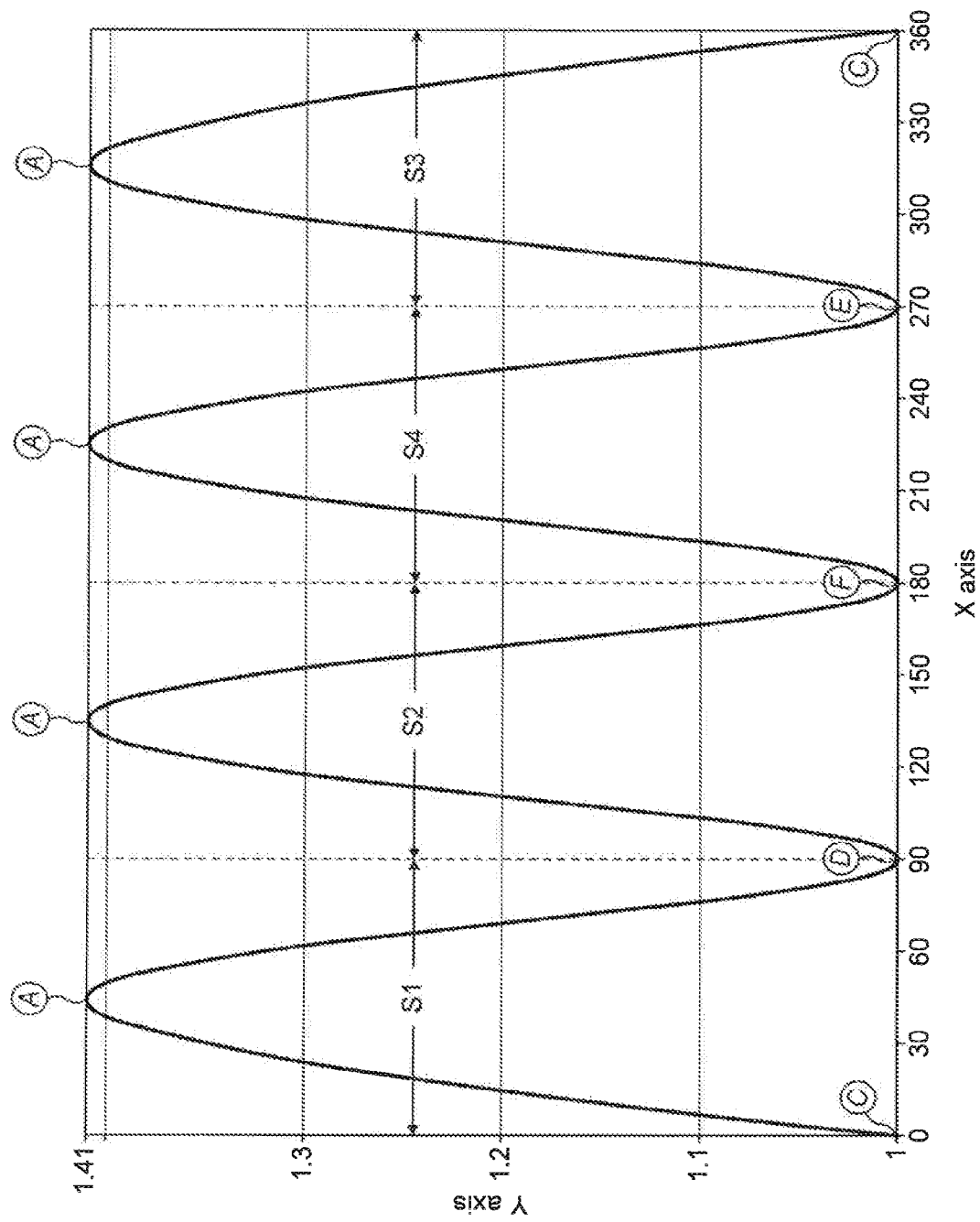

FIGS. 19A-C show schematically in cross-section the first lens assembly of the invention in the un-actuated stale (FIG. 19A), an actuated state (FIG. 19B) and a de-actuated state (FIG. 19C);

FIGS. 20A-C show schematically the front elevation of the first lens assembly of the invention in the un-actuated state (FIG. 20A), an actuated state (FIG. 20B) and a de-actuated state (FIG. 20C);

FIGS. 21A-C show schematically in cross-section a second square lens assembly of the invention in an un-actuated state (FIG. 21A), an actuated state (FIG. 21B) and a de-actuated state (FIG. 21C);

FIGS. 22A-C show schematically the front elevation of the second lens assembly of the invention in the un-actuated state (FIG. 22A), an actuated state (FIG. 22B) and a de-actuated state (FIG. 22C);

FIG. 23 shows how the distance between the optical centre and the membrane supporting rings varies in the first lens assembly;

FIG. 24 shows how the distance between the optical centre and the membrane supporting rings varies in the second lens assembly of FIGS. 21A-C and FIGS. 22A-C.

Figure 25:
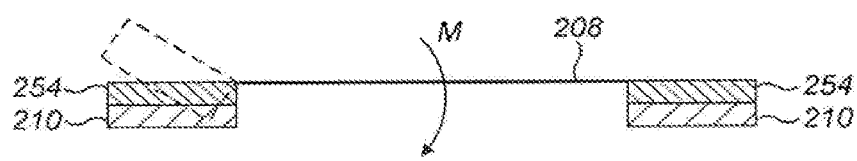
Figure 26:
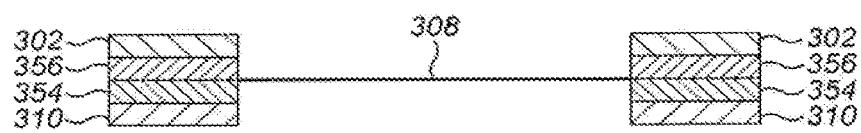

FIG. 25 shows schematically in cross-section a flexible membrane and single supporting ring in accordance with the invention; and FIG. 26 shows schematically in cross-section the flexible membrane and supporting rings of the first lens assembly in accordance with the invention.

Figure 1:
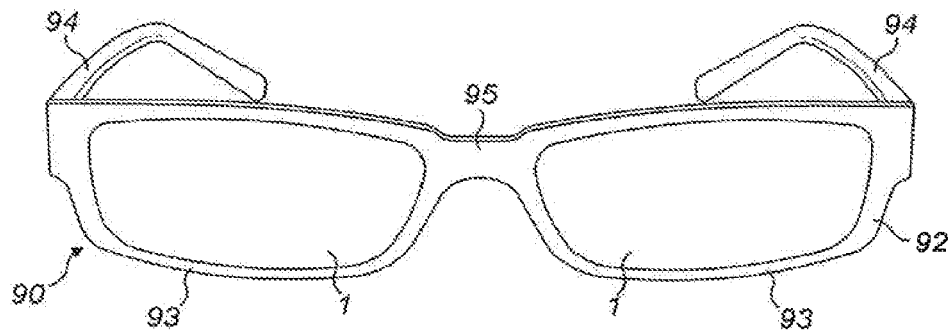
FIG. 1 is a perspective view from above of the front of a pair of eyeglasses comprising a frame that is fitted with two first lens assemblies according to the invention.

With reference to FIG. 1, a pair of eyeglasses 90 (UK: spectacles) comprise a frame 92 having two rim portions 93 and two temple arms 94. The rim portions 93 are joined together by a bridge 95, and each is shaped and dimensioned to carry a respective first lens assembly 1 in accordance with the present invention. One of the first lens assemblies 1 is used for the right side of the eyeglasses, and the other is used for the left side. As can be seen from FIG. 1 the right-hand and left-hand lens assemblies 1 are mirror images of one another, but their construction is otherwise identical, and therefore only the left-hand side one is described in detail below, but it will be appreciated that the construction and operation of the right-hand side one is the same.

Figure 3:
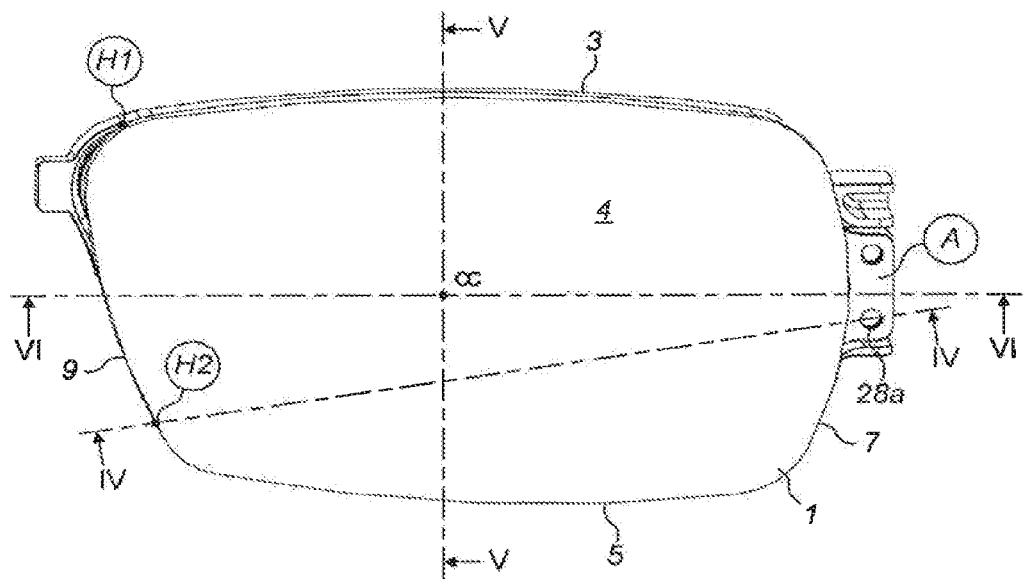
FIG. 3 is a front elevation of the first lens assembly in accordance with the invention in the un-actuated state.

As best seen in FIG. 3, the first lens assembly 1 has a generally rectangular shape with two opposing long sides 3, 5 and two short sides 7, 9 and is designed to fit with the frame 92, but it will be appreciated that the shape of the first lens assembly shown is only one example of a suitable shape, and a lens assembly in accordance with the invention may be given any shape that is desired. The invention is especially suited for non-round shapes, such as the one shown in FIGS. 1 and 3, but the teachings of the invention may also be applied to round lenses. In round lenses, the invention may be used, by way of example, for the correction of aberrations in an optical system requiring more than spherical wave-front correction.

As well as eyeglasses, the lens assembly of the present invention is equally well applicable to other lens applications, such as goggles, helmets and scientific and optical instruments of various sorts. In the lens assembly 1 the optical parts as described below are transparent, but the invention also comprehends other kinds of deformable membrane assemblies which are constructed and operate in a similar manner to provide a controllable adjustable surface, and thus such membrane assemblies in accordance with the invention may also find application in non-optical fields, such as acoustics where a surface with a selectively and controllably adjustable shape may be required.

The first lens assembly 1 is especially suitable for use in the correction of presbyopia. In use, the first lens assembly 1 can be adjusted for bringing into focus objects at a range of distances from long distance to close distance. In this embodiment there is no correction provided for long distance, but nevertheless, the first lens assembly 1 allows a user to re-focus smoothly from a far-away object to a near, reading-distance object.

The first lens assembly 1 comprises a pair of membrane supporting rings 2, 10 of uniform thickness but variable width. The design of these rings is explained in more detail below. A retaining ring 6 holds the parts of the first lens assembly 1 together.

Figure 8:
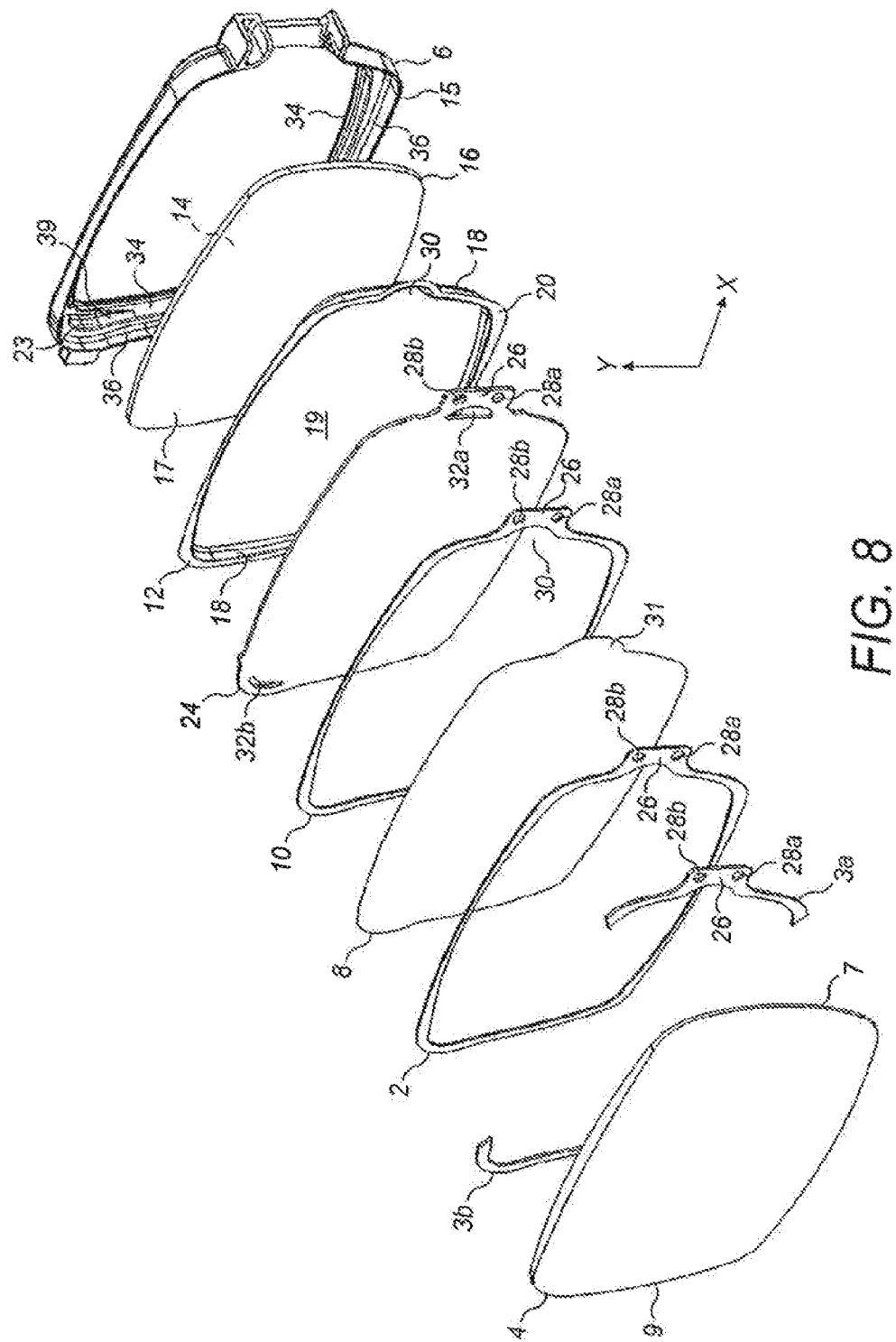
FIG. 8 is an exploded view of the first lens assembly showing the parts of the assembly.

In FIG. 8, the component parts of the first lens assembly 1 can be seen in exploded view. The front of the first lens assembly 1 is shown at the top right of the figure, and the rear of the assembly (which in use would be closest to the wearer's eye) is at the bottom, although it will be appreciated that all the other parts fit into the retaining ring 6, which forms an enclosing housing for said other parts.

Figure 4:
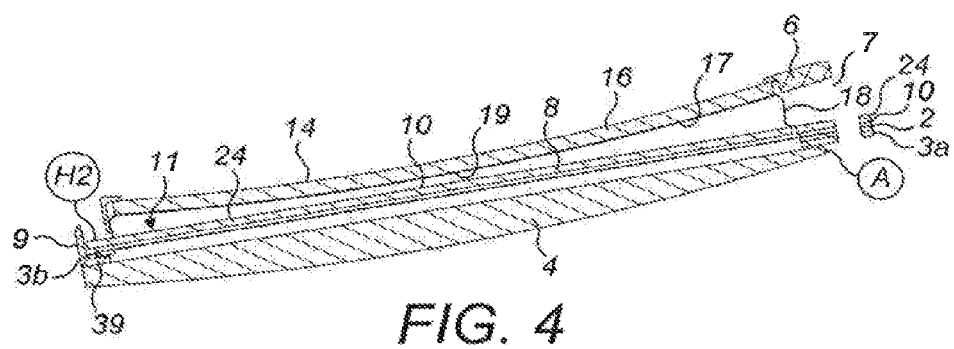
FIG. 4 is a cross-section of the first lens assembly along the line IV-IV of FIG. 3.

At the front of the first lens assembly 1 is a transparent front cover plate 4, made of glass or a suitable polymeric material. In the first lens assembly the front cover plate is about 1.5 mm thick, but this may be varied as mentioned below. Further, in some embodiments, as described below, the front cover plate 4 may comprise a lens of fixed focal power(s), for example a single vision (single power), multifocal (two or more powers), progressive (graded power) or even an adjustable element. As shown in FIG. 4 for example, in the present embodiment, the front cover plate 4 is plano-convex.

Behind the front cover plate 4 are disposed two stiffening ribs 3a, 3b, which provide extra stiffness at the short sides 7, 9 of the first lens assembly 1, as described in more detail below. Next is a front one of the pair of resiliently bendable supporting rings 2. The rings may be made of stainless steel and, in the first assembly, are about 0.3 mm thick, but other suitable materials may be used and the thickness adjusted accordingly to provide the desired stiffness as discussed below. Next is a transparent non-porous, elastic membrane 8. In the first assembly the membrane 8 is made of Mylar® and is about 50 microns thick, but other materials with a suitable modulus of elasticity may be used instead. Behind the membrane 8 is disposed a rear one of the pair of bendable supporting rings 10 of substantially the same geometry as the front supporting ring 2. The flexible membrane 8 is pre-tensioned as described below and attached to and sandwiched between the front and rear supporting rings 2, 10, such that it is stably supported around its edge, as shown in FIGS. 3-7 in which the first lens assembly 1 is shown in its assembled condition. The membrane 8 forms a fluid-tight seal with at least the rear supporting ring 10.

The rear surface of the second supporting ring 10 is sealed to a transparent reinforcing diaphragm 24. In the first embodiment the reinforcing diaphragm 24 may comprise a sheet of polycarbonate, but alternative materials that are suitable to provide the required properties as described below may be used instead. Behind said diaphragm is a dish-shaped part 12 having a flexible side wall 18, a rear wall 19 and a forward sealing flange 20. In the first assembly the dish-shaped part 12 is made of transparent DuPont® boPET and is about 6 microns thick, but other suitable materials for the dish-shaped part may be used and the thickness adjusted accordingly. The forward sealing flange 20 of the dish-shaped part 12 is sealingly adhered to the rear surface of the diaphragm 24 with a suitable adhesive such, for example, as Loctite 3555.

A layer of a suitable transparent pressure-sensitive adhesive (PSA) such, for example, as 3M® 8211 (not shown) adheres the rear wall 19 of the dish-shaped part 12 to a front face 17 of a transparent rear cover plate 16 having a rear face 14. In the first lens assembly 1 described herein the layer of PSA is about 25 microns thick, but this may be varied as required. The rear cover plate 16 may be made of glass or polymer and in the first assembly 1 is about 1.5 mm thick, but again this may be varied as desired. The rear cover plate 16 sits as the rearmost layer within the retaining ring 6. As with the front cover plate 4, in some embodiments, the rear cover plate 16 may form a lens of a fixed focal power. In the present embodiment, as seen in FIG. 4 for example the rear cover plate 16 is a meniscus lens.

The retaining ring 6 comprises a forwardly extending side wall 13 having an inner surface 23, which side wall 13 terminates in a front edge 15. The front cover plate 4 sits on and is bonded to the front edge 15 of the retaining ring 6 so that the lens assembly constitutes a closed unit. As best seen in FIGS. 4, 5, 11 and 12, the cover plate 4 is spaced forwardly of the front membrane supporting ring 2 to provide a space within which the membrane 8 may distend forwardly in use as described below without impinging on the front cover plate.

The dish-shaped part 12, membrane 8, second supporting ring 10 and diaphragm 24 thus define a sealed interior cavity 22 for holding a transparent fluid. For optical applications, such as the first lens assembly 1 described here, the membrane 8 and the rear face 14 of the rear cover plate 16 form the opposite optical surfaces of an adjustable lens. As described above the rear cover plate 16 is a meniscus lens. In an un-actuated state, the membrane is planar, so the lens has the fixed optical power afforded by the rear cover plate 16, with zero addition from the membrane 8. However, when actuated as described below, the membrane 8 is inflated to protrude forwardly in a convex configuration and thus adds positive optical power to the fixed meniscus lens. In some embodiments, the membrane may distend inwardly in a concave configuration such that in combination with the rear face 14 of the rear cover plate 16, the lens 1 is biconcave. The greater the curvature of the membrane 8, the greater the additional optical power afforded by the membrane 8. For non-optical applications the fluid, along with the other parts of the assembly, do not need to be transparent.

The side wall 18 of the dish-shaped part 12 provides a flexible seal between the rear wall 19 and the diaphragm 24, thus forming the sides of the cavity 22. This flexible seal is provided so that there can be relative movement between the supporting rings 2, 10 and the rear cover plate 16 when the first lens assembly 1 is actuated to adjust the power of the lens. The deformable membrane 8 is adhered to the first 2 and second 10 supporting rings, for example by Loctite® 3555.

The cavity 22 is filled during manufacture with a transparent oil 11 (see FIG. 7), such for example as Dow Corning DC705, which is chosen to have an index of refraction as close as possible to that of the rear cover plate 16. The oil 11 is also chosen so as to not be harmful to a wearer's eye in the event of a leakage.

Figure 2:
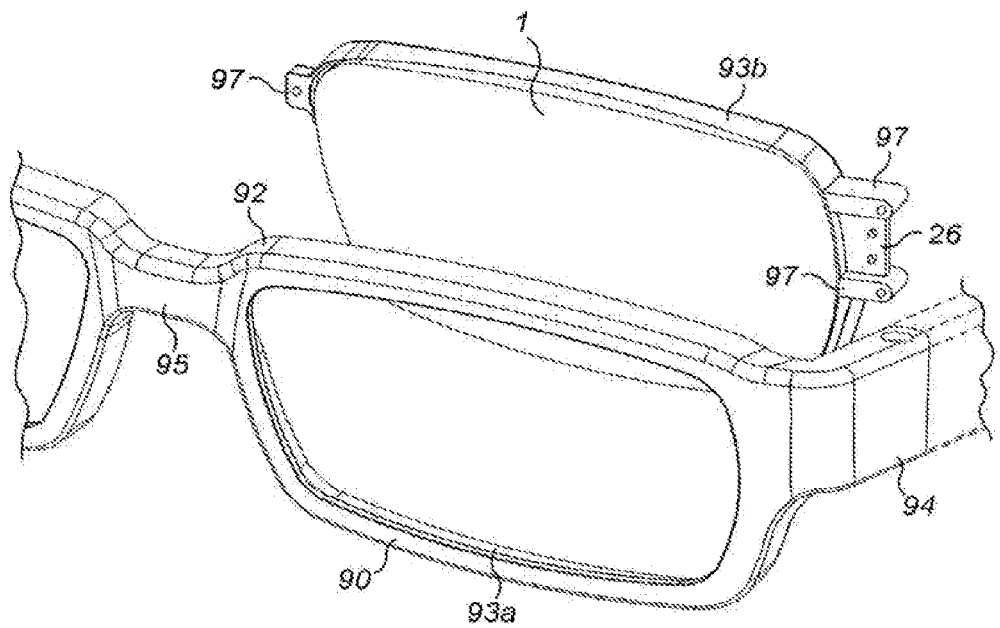
FIG. 2 is a perspective view from above and to the left of the left hand side of the eyeglasses of FIG. 1 showing how one of the first lens assemblies is fitted to the frame.
Figure 6:
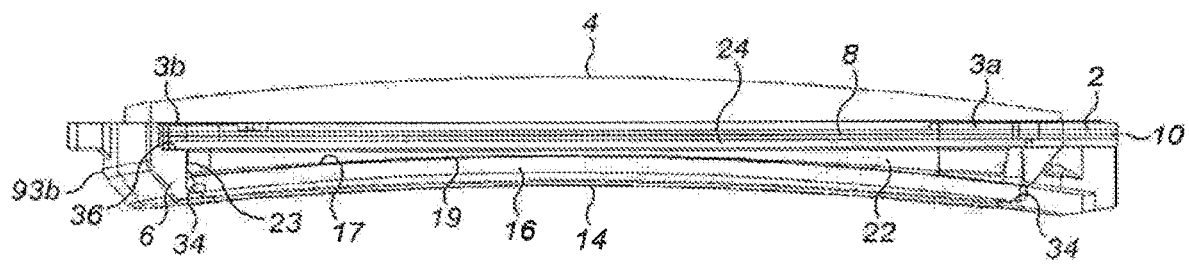
FIG. 6 is a cross-section of the first lens assembly along the line VI-VI of FIG. 3.
Figure 7:
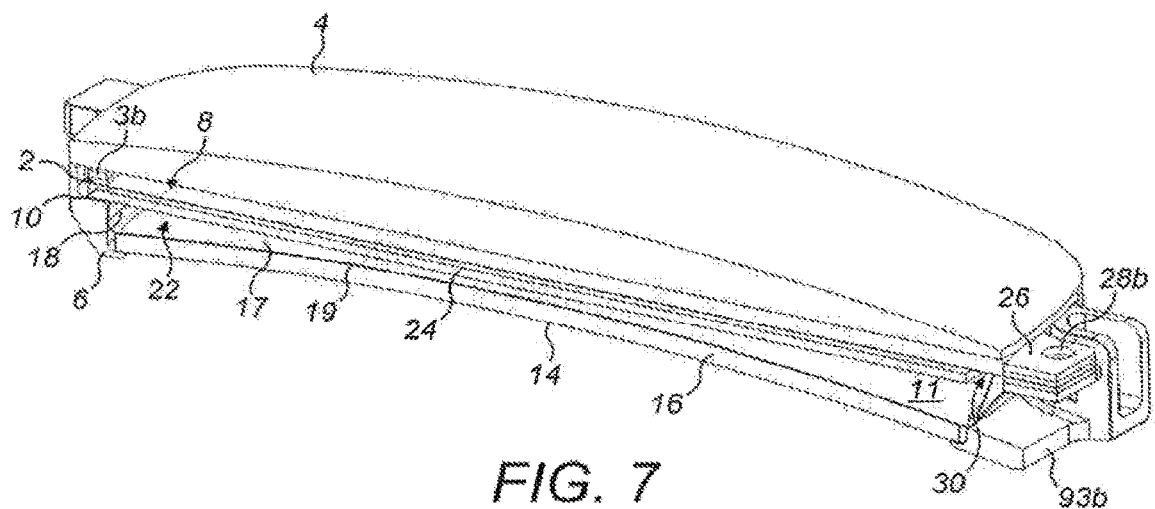
FIG. 7 is a perspective view from below and to the left of the front of the first lens assembly of the invention which is shown cut-away along the line VI-VI of FIG. 3.

As shown in FIGS. 6 and 7, the first lens assembly 1 may be received and seated snugly in a rear rim part 93*b* which is shaped and dimensioned to mate with a front rim part 93*a* as shown in FIG. 2 to form one rim portion 93 of the frame 92 of the eyeglasses 90. The front and rear rim parts 93*a*, 93*b* may be fixed together by any suitable means available to the person skilled in the art. For instance, the front and rear rim parts may be formed with matching screw holes 97 that are adapted to receive small fixing screws for holding the two rim parts securely together and to retain the lens assembly 1 therebetween. In some embodiments, the rear rim portion 93*b* may be formed integrally with the retaining ring 6.

In some embodiments the reinforcing diaphragm 24 may be omitted, in which case the sealing flange 20 of the dish-shaped part 12 would be attached directly to the rear surface of the rear supporting ring 10.

It will be appreciated that the present invention is not limited to the particular materials and dimensions given above, which are given only by way of example. Different types of materials may suitably be used for the dish-shaped part 12 that are optically clear, have low overall stiffness compared with the supporting rings 2, 10 and are joinable to the diaphragm 24 or rear supporting ring 10.

Various different materials may suitably be used for the supporting rings 2, 10 provided they fulfil the criteria of: having sufficiently high modulus to be able to be made thin relative to the overall depth of the first lens assembly 1 (i.e. of the order of 0.3 mm thickness); being joinable to the adjacent components; having low creep (to continue to perform over multiple uses); and being elastically deformable. Other possibilities are titanium, glass and sapphire. By "joinable" is meant by joinable by adhesive, crimping, laser welding or ultrasonic welding or any other means that would be apparent and available to those skilled in the art.

Different adhesives may suitably be chosen that are able to join the parts of the assembly durably, are creep resistant, are of a suitable viscosity to be applied when constructing the lens assembly and remain inert in the presence of the fluid in the lens. Particular adhesives may be chosen in dependence on materials selected for the various parts.

There are various other suitable materials that permit sufficient flexing of the membrane 8, and various colourless oils may be used, particularly in the family of high refractive index siloxane oils for which there are a number of manufacturers. The materials chosen for the various components need to be such that they provide stability around the hinge and actuation points (described below with reference to FIGS. 9 and 10).

The first lens assembly 1 provides an adjustable lens having a focal power that can be adjusted by controlling pressure of the fluid 11 within the cavity 22 and the shape of the bendable supporting rings 2, 10, thereby controlling deformation of the elastic membrane 8 into a desired profile. As mentioned above the membrane 8 forms one of the optical surfaces of the lens, the other one being the rear face 14 of the rear cover plate 16. Deformation of the membrane 8 increases the curvature of the optical surface provided by the membrane and changes the optical thickness of the lens between the surfaces, thereby increasing the additional optical power afforded by the membrane 8. Details of this operation are given below.

Figure 9:
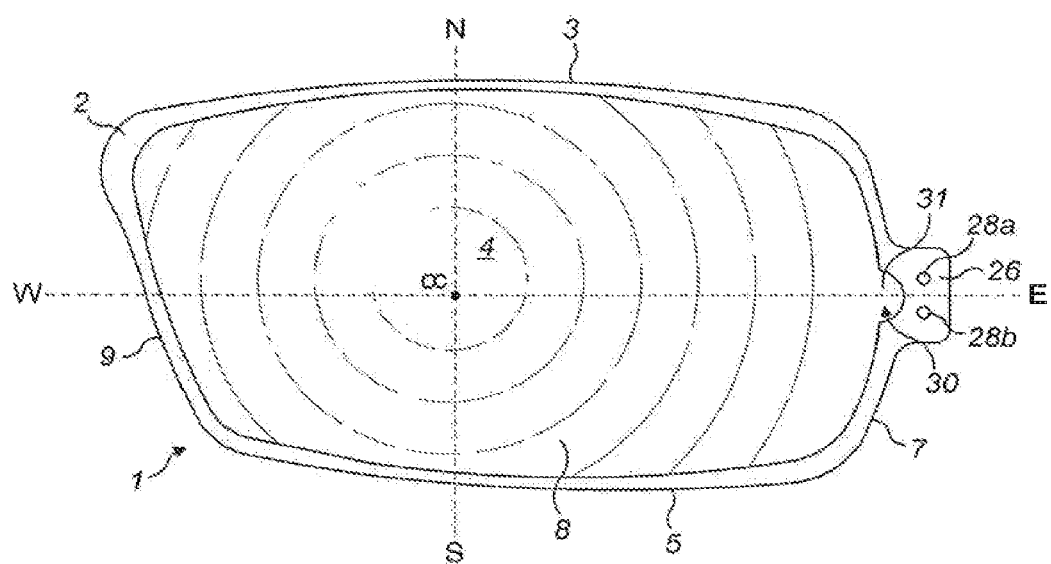
FIG. 9 is a front elevation of the flexible membrane and membrane supporting rings of the first lens assembly in the un-actuated state, showing how the width of the rings varies round the periphery of the membrane to control the second moment of area of the rings.

As best seen in FIG. 9 the width of the supporting rings 2, 10 in the x-y plane normal to the front-rear z-axis of the lens assembly 1 varies in a predetermined manner round the periphery of the assembly 1. This is to provide for the desired deformation of the supporting rings 2, 10 which in turn controls deformation of the flexible membrane 8 and hence the power of the lens, as explained in more detail below.

It can be seen from FIG. 8 that each of the supporting ribs 3*a*, 3*b*, the supporting rings 2, 10 and the reinforcing diaphragm 24 has a protruding tab 26 of similar shape and size which protrudes outwardly of the first lens assembly 1 from one of the short sides 7 of the assembly 1. When assembled, the tabs 26 on these parts are aligned with each other, and each is formed with one or more closely adjacent holes 28*a*, 28*b* that align with the corresponding holes in the other parts. These holes 28*a*, 28*b* define an actuation point Ⓐ for attachment of an actuation device to the lens assembly 1 to cause it to be compressed in use. Compression of the lens 1 is described in more detail below. The actuation device may be housed in the adjacent temple arm 94 of the frame 92. In some embodiments the lens assembly may be expanded in a similar manner to reduce the pressure of fluid 11 within the cavity 22.

Figure 10:
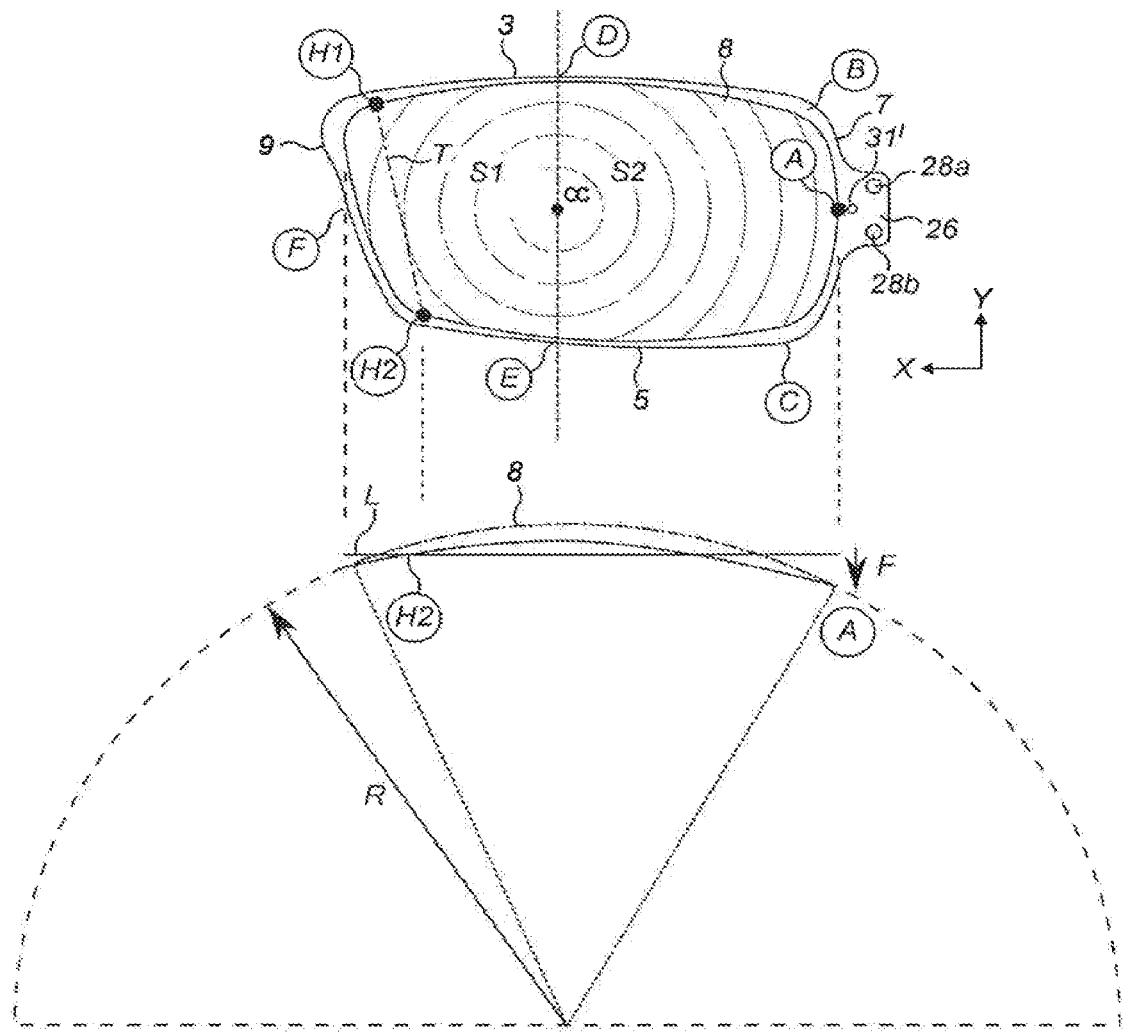
FIG. 10 shows the membrane and rings of FIG. 9 in an actuated state and projected onto a notional sphere of radius R.

Adjacent the protruding tab 26 at the one short side 7 of the assembly, the inner edge of each of the supporting rings 2, 10 deviates outwardly as best shown in FIG. 9 to form a generally semi-circular recess 30. The side wall 18 of the dish-shaped part 12 has a similar, corresponding recess 30 which aligns with the recesses 30 of the supporting rings 2, 10 when the lens is assembled. The membrane 8 includes a corresponding semi-circular protruding portion 31 that aligns with the recesses 30 to ensure the closure of the seal afforded by the membrane. The reinforcing diaphragm 24 is cut-out at 32a, which also aligns with the tabs 26. This allows filling of the reservoir 22 after all the parts have been assembled by protruding beyond the extent of the front and rear cover plates 4, 16. Alternatively as shown in FIG. 10 a separate hole 31' though the supporting rings 2, 10 may be provided instead of said semi-circular recess 30.

The reinforcing diaphragm 24 affords significant improvements over prior fluid-filled lenses by dint of its function to stiffen the supporting rings 2, 10 in the plane defined by the rings in the un-actuated state. It is desirable to pre-tension the membrane 8 when assembling the parts, otherwise undesired wrinkles or sag may appear in the membrane owing to temperature and gravitational or inertial effects on the fluid pressure and the like. One way to minimise the risk of such wrinkles or sag would be to support the flexible membrane 8 on an inflexible supporting ring, but this would be incompatible with the need for the supporting rings 2, 10 to bend in use. The reinforcing diaphragm 24, which strengthens the supporting rings 2, 10 in the plane of the membrane 8 to resist bending, but does not significantly add to the stiffness of the rings transverse the membrane (z axis), provides a solution to this problem.

In the first lens assembly 1 described herein, in which the distance between the long sides 3, 5 is less than the distance between the short sides 7, 9—making the first assembly generally rectangular. The lens is thus wider in the E-W direction between the short sides 7, 9 as shown in FIG. 9 than it is in the N-S direction between the long sides 3, 5. The supporting rings 2, 10 are configured to bend more along the long sides. It will be appreciated that, when actuated, the membrane 8 is stretched more in the E-W direction than it is in the N-S direction. Since the diaphragm 24 can only bend and not distend, it can only bend in one direction, so it bends along the E-W axis of the lens. Bending a beam brings the two ends of it slightly closer together, and this compensates for the differential strain in the membrane 24.

In some embodiments, the diaphragm 24 may be made stiffer in the E-W direction than in the N-S direction, and this directional stiffness of the diaphragm 24 may be used to compensate for the above-mentioned differential strain in the membrane 8.

Figure 5:
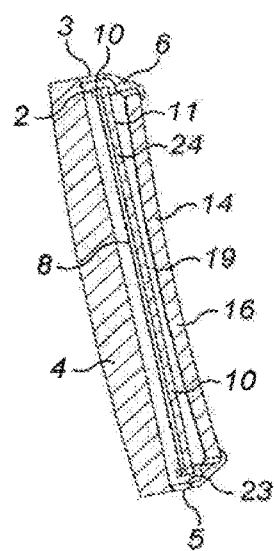
FIG. 5 is a cross-section of the first lens assembly along the line V-V of FIG. 3.

In the first lens assembly 1, the reinforcing diaphragm 24 is made from a transparent material that is index-matched with the membrane 8 and the fluid 11 within the cavity 22. It comprises a flat sheet that is placed within the fluid of the lens between the sealing flange 20 of the dish-shaped part 12 and the rear supporting ring 10, so that it lies behind the flexible membrane 8 in the assembled lens 1, as best seen in FIGS. 4 and 5. The diaphragm 24 is shaped similarly to the other parts of the lens assembly 1, and in the first assembly is 0.55 mm thick, although this thickness may be varied as desired. Since the diaphragm 24 is attached to the dish-shaped part 12 and the rear supporting ring 10 round its edge, the stiffness of the supporting rings 2, 10 must be adjusted accordingly such that they are still able to bend as required in the z direction transverse the plane of the membrane 8.

The reinforcing diaphragm 24, in accordance with the invention, has been found to work better than, for example, localised support of the supporting rings 2, 10. In one embodiment, the supporting ring size and stiffness may be reduced by approximately 25% as compared with the size and stiffness of similar supporting rings 2, 10 that are stiff enough by themselves to prevent wrinkles without an associated diaphragm 24. The necessary ability of the supporting rings 2, 10 to flex to control the deformation of the flexible membrane 8 is not impaired. A suitable material for the support disc 24 is polycarbonate, but other materials may suitably be used. The reinforcing diaphragm 24 of the invention is equally suitable for use in round lenses as it is for non-round lenses, but in such other embodiments the diaphragm does not necessarily need to have differential stiffness on different axes.

The design of the reinforcing diaphragm 24 is such that its main effect is to increase the stiffness of the supporting rings 2, 10 in the in-plane direction normal to the front-rear axis of the assembly (x-y plane in FIG. 10), but has only a small effect on the bending stiffness in the z direction (i.e. normal to the rear wall 19). This z-direction effect is accounted for in the design of the supporting rings 2, 10. Thus the stiffness of the assembly 1 is increased for the purpose of maintaining tension in the flexible membrane 8, but the supporting rings 2, 10 can still bend in the z direction in use. This may be achieved by choosing for instance a fibre material which has stiffness in the x-y plane but little stiffness in the z-direction, owing to the orientation of the fibres. The diaphragm 24 is formed with a plurality of apertures 32a, 32b; in the first lens assembly 1 described herein there are two—one adjacent the aforementioned tab 26, and the other in a corner of the other opposite short edge 9 of the assembly. The material surrounding the apertures 32a, 32b provides the stiffness, but the apertures 32a, 32b allow fluid to pass through and hence have little or no effect on deformation of the flexible membrane 8. The precise number, size and arrangement of the apertures 32a, 32b may be varied as desired—for example a plurality of smaller apertures spaced across the diaphragm 24 may be provided. The diaphragm 24 does not deform with the flexible membrane 8, and the support it provides for the membrane 8 is not needed when the lens is in an actuated state with the membrane distended as described below. In the first lens assembly 1 the reinforcing diaphragm 24 comprises a continuous sheet that is formed with a number of apertures 32a, 32b as described above, but in other embodiments, the diaphragm may comprise a reticulated sheet or a mesh or the like, as long as it is joined to the supporting rings 2, 10 round substantially their whole extent in order to provide the desired in-plane stiffness. The diaphragm may be connected to the rings 2, 10 substantially continuously or at spaced locations around its periphery provided that the load is distributed uniformly without giving rise to any significant local distortion of the rings or membrane 8. In non-optical applications, there is no need for the diaphragm to be transparent.

As best seen in FIG. 6 the inner surface 23 of retaining ring 6 is formed with two spaced circumferential shelves 34, 36: a rear shelf 34 and a forward shelf 36. The rear shelf 34 is disposed proximate the rear of the retaining ring 6; the rear cover plate 16 is supported on said rear shelf. The forward shelf 36 is disposed intermediate the front edge 15 of the retaining ring 6 and serves to support the diaphragm 24 and front and rear supporting rings 2, 10. The side wall 18 of the dish-shaped part 12 is dimensioned such that its front sealing flange 20 is supported on the forward shelf 36 when the lens is assembled.

At said other short side 9 or the first lens assembly 1, the retaining ring 6 defines two hinge points (H)1, (H)2—see FIG. 10. As shown in FIG. 4, the stacked parts 2, 3b, 8, 10, 12, 24 are held in place within the retaining ring 6 by means of formations 39 formed integrally with the retaining ring 6 at the hinge points (H)1, (H)2, such that they remain stable when the lens is actuated as described below.

The supporting rib 3b provides additional stiffness for the supporting rings 2, 10 in the region of the hinge points (H)1, Ⓗ2 and between them. In the first lens assembly 1, the hinge points Ⓗ1, Ⓗ2 and the region of the supporting rings 2, 10 between them are approximately equidistant from the optical centre OC of the lens when actuated (see FIG. 10), and so the rings 2, 10 intermediate the hinge points Ⓗ1, Ⓗ2 are not required to bend much or at all. The other supporting rib 3a similarly provides additional stiffness for the supporting rings 2, 10 at the aforementioned actuation point Ⓐ so that deformation of the membrane 8 is properly controlled, as explained in more detail below. In some embodiments the supporting ribs 3a, 3b may be omitted; they are generally useful for regions of the supporting rings 2, 10 that are not required to deform significantly during actuation of the assembly.

The shape of the first lens assembly 1 is suitable for the eyeglasses 90 in terms of its aesthetic appearance. However, a non-round lens gives rise to the problem of non-uniform, or undesired, deviation from the desired shape of deformation of the membrane, which would occur in the absence of a solution to the problem. The means by which the present invention addresses and solves this problem is explained below.

Figure 11:
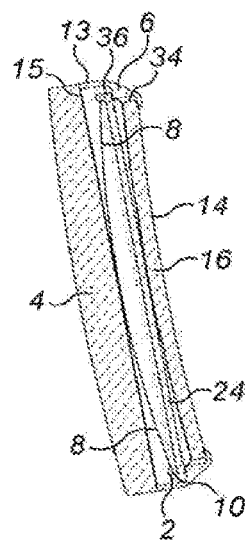
FIG. 11 is a cross-section of the first lens assembly which corresponds to FIG. 4 but shows the assembly in an actuated state.
Figure 12:
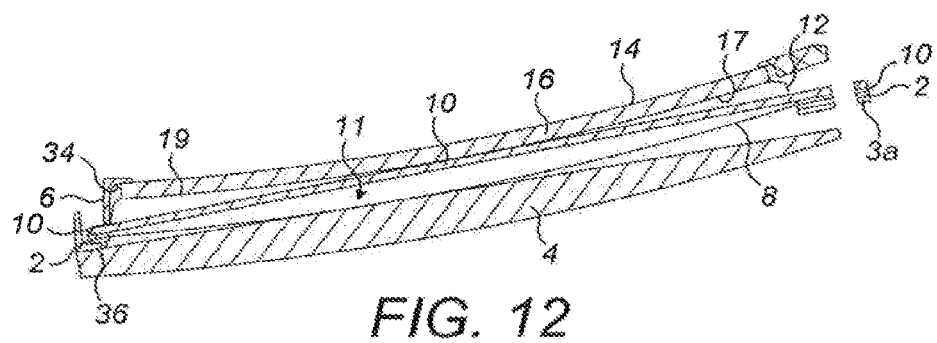
FIG. 12 is a cross-section of the first lens assembly which corresponds to FIG. 5 but shows the assembly in an actuated state.

FIG. 10 illustrates how a surface of the desired shape is achieved using a membrane assembly of the invention. In FIG. 10, the desired shape is spherical, but as described in more detail below the assembly of the invention can be used to form other shapes; for instance shapes defined by one or a combination of Zernike polynomials. For non-optical applications, different shapes may be required. The lens assembly 1 in an actuated state is shown in FIGS. 11 and 12.

FIG. 10 thus shows the membrane 8 of the non-round first lens assembly 1 in an actuated state projected onto an imaginary sphere of radius R to afford a positive focal power. The actuation point Ⓐ and hinge points Ⓗ1, Ⓗ2 are shown. A force F may be applied at the actuation point Ⓐ by means of an actuation device connected via the holes 28a, 28b.

The lower half of FIG. 10 shows a section on the line b-b of the upper half through the optical centre OC at the vertex of the membrane 8 in the actuated state. The direction of application of the force is shown (downwards in FIG. 10). The membrane 8 is distended in a substantially part-spherical configuration, and the edge of the membrane 8 defined by the supporting rings 2, 10 has a profile that substantially follows the surface contours of the sphere. In the un-actuated state the membrane 8 is flat, and the edge of the membrane (and thus the supporting rings 2, 10) is also flat—represented by line L in the lower half of FIG. 10. In the actuated state, the membrane 8 substantially follows the surface of the sphere, and its edge no longer lies in a plane (as it would do if the lens were circular and the membrane formed a spherical cap). This can be seen by comparing the edge of the membrane with the line L. In the actuated state the membrane 8 is displaced at the actuation point Ⓐ below the line L, representing the plane of the membrane 8 in the un-actuated state, but where the long sides 3, 5 of the membrane deviate (inwardly) from a round shape, they are displaced above the line L, so that a major portion of the edge of the membrane would fit contiguously against the surface of a sphere of radius R.

In FIG. 10 the optical centre OC is located, according to ophthalmic convention, at a predetermined distance from the centre of the bridge 94 of the eyeglasses 94. This distance is half the centration distance, which is the distance between the optical centres of the two lenses 1 of the eyeglasses 90, which in turn is the optimum distance for a wearer of the eyeglasses. With the shape of lens illustrated, the point OC is approximately central between the long sides 3, 5 of the lens assembly, but is positioned leftwards of the visually observed geometric centre on the axis between the short sides (i.e. from eye to nose when worn).

The lens assembly of the present invention is adapted to provide a continuously adjustable lens power by a desired number of dioptres D, typically 0 to +4 D, which is additive with any lensing power afforded by the front cover plate 4 and/or rear cover plate 16. In general, the power of a lens D is given by the product of the difference in refractive index of the lens material and its environment, and the curvature of the interface. Thus the formula is:

$$D=(n-1)(1/R) \quad (I)$$

Where n is the refractive index, 1 is taken as the refractive index of air and R is the radius of the sphere of which the lens forms part (as illustrated in FIG. 3b).

Figure 13:
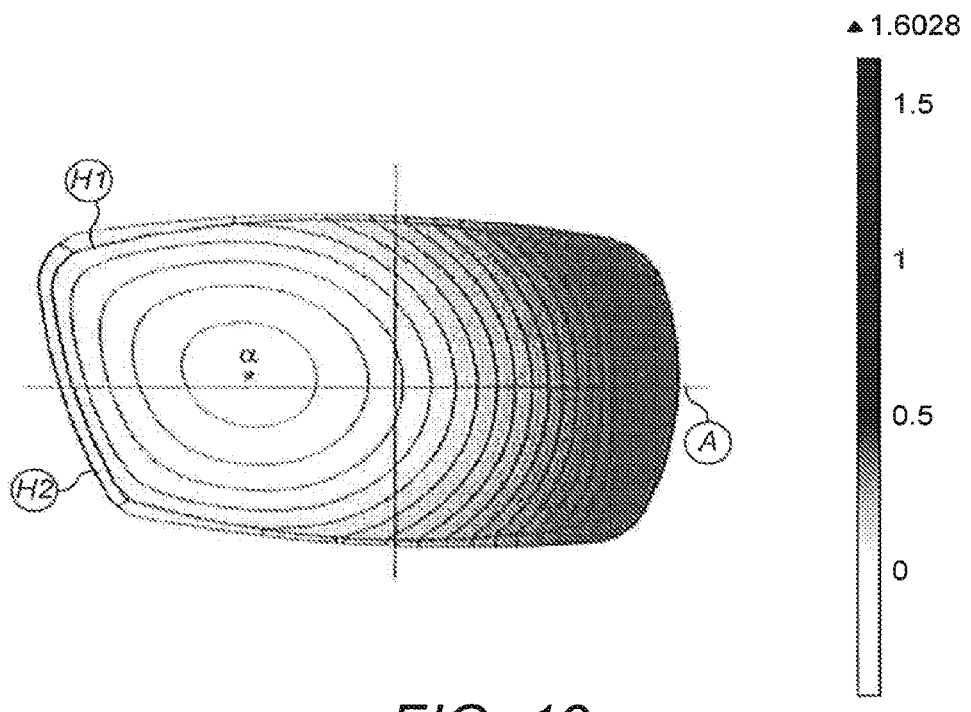
FIG. 13 shows the displacement of the membrane of the first lens assembly in an actuated state, as calculated by static finite element analysis (FEA)

In the lower half of FIG. 10, the edge of the membrane 8 is maximally displaced at the actuation point Ⓐ in the direction of application of the force F. The hinge points Ⓗ1, Ⓗ2 coincide with points on the edge of the membrane 8 (as defined by the supporting rings 2, 10 in the first lens assembly 1) that involve substantially no displacement upon deformation of the membrane 8. It can be seen that these points in the actuated position have not moved from and lie approximately on the line L. (Note they are out of plane of the section shown in the lower half of FIG. 10). In order to control optimally the deformation of the membrane 8, the hinge points Ⓗ1, Ⓗ2 should be located where minimal movement or no movement of the edge of the membrane 8 is required, otherwise the profile of the edge of the membrane would deviate at the hinge points Ⓗ1, Ⓗ2 from the desired spherical (or other) shape, resulting in unwanted distortion of the membrane. Suitably the hinge points Ⓗ1, Ⓗ2 may be generally equidistant from the optical centre OC as mentioned above, so that they lie on the same circular contour of displacement when the lens is actuated, i.e. a contour of no displacement. However, depending on the shape and other parameters of the lens assembly 1 this may not be possible, and some difference in the distances between the respective hinge points Ⓗ1, Ⓗ2 and the optical centre OC can be tolerated, notwithstanding the resulting distortion that will occur in the vicinity of one or both hinge points Ⓗ1, Ⓗ2. In FIG. 10, it can be seen that one hinge point Ⓗ1 is situated further from the centre OC than the other hinge point Ⓗ2, leading to some distortion of the membrane in the corners of the lens adjacent the hinge points Ⓗ1, Ⓗ2, but this is tolerable, provided there is a major zone around the centre OC where little or no distortion occurs. This is best shown in FIG. 13.

It will be appreciated that maximal displacement of the membrane 8 occurs at the actuation point Ⓐ, which should always lie on the desired locus of displacement of the membrane edge to define a spherical-fitting profile between the un-actuated and maximum focal power positions. Since the edge of the membrane 8 at the one short side 7 of the lens, which includes the actuation point Ⓐ, happens to be substantially circular should be it follows a circular contour of displacement when actuated, but again some deviation from circular can be tolerated. The actuation point should therefore be located on the one short side 7 at the point furthest away from the optical centre OC. Were the particular shape considered here not such that a segment of its perimeter formed a circular arc about the optical centre, additional actuation point(s) (active or passive) may be requited to maintain the surface fidelity. It will be seen from FIG. 10 that in the first lens assembly 1, the points furthest away from the centre OC are in the corners of the membrane 8, between the long sides 3, 5 and the one short side 7—identified as positions Ⓑ and Ⓒ in FIG. 10. However the actuation point Ⓐ is proximate to these points and the stiffening rib 3a serves to distribute the load applied at the actuation point Ⓐ along the one short side 7 of the membrane 8 with an acceptable degree of distortion of the membrane shape.

Those skilled in the art will understand that the optical power of the first lens assembly 1 can be varied effectively by varying the radius R of the sphere, which varies the curvature of the optical surface provided by the flexible membrane 8 and hence adjusts the power of the lens. As R is reduced, the optical power of the lens increases because the curvature of the membrane is more pronounced. This is achieved by greater deformation of the membrane 8, which in turn is effected by increasing the displacement of the supporting rings 2, 10 at the actuation point Ⓐ rearwardly towards the rear cover plate 16, resulting in greater fluid pressure in the cavity and greater forwards distension of the membrane.

The way that this variable deformation is achieved for the first lens assembly 1 according to the invention is described in greater detail below.

FIGS. 3-5 show the first lens assembly 1 is its un-actuated state, and FIGS. 11 and 12 show an exemplary actuated state. In practice the first lens assembly 1 is continuously adjustable between the un-actuated state and its maximum deformation; the actuated position of FIGS. 11 and 12 is just one deformed position which is provided as an exemplar of all deformed positions. As described above, the width of the supporting rings 2, 10 varies round their extent, while their thickness in the z-direction remains substantially constant. Specifically the rings 2, 10 are widest at the short sides 7, 9 of the assembly 1 and become progressively narrower away from those short sides towards the middles of the long sides 3, 5 as best seen in FIG. 9. They are thinnest at points Ⓓ and Ⓔ on the longer sides intermediate the short sides 7, 9 (see FIG. 10). Note the thinnest points are not necessarily symmetrical as between the two long sides; they are thinnest in this region because this is where their bending needs to be greatest, as can be understood with reference to FIG. 10 described above.

In operation, in order to increase the focal power of the lens assembly 1, an actuating force F is applied, directly or indirectly, to the supporting rings 2, 10 at the point Ⓐ on the one short side 7 of the assembly to move the supporting rings 2, 10, and the membrane 8 clamped between them, rearwardly towards the rear cover plate 16. The force is applied about half-way along the one short side 7 and the actuating device should be arranged to react against the retaining ring 6 which is held within the rim 93 of the frame 92 which thus serves as a support.

There are various means by which the actuating force may be applied that will be apparent to those skilled in the art; some embodiments are disclosed below. The force should be applied in a direction that is substantially normal to the plane of the supporting rings 2, 10. As described above, the supporting rings 2, 10 are hinged at the two points Ⓗ1, Ⓗ2 on the other short side 9 of the assembly 1. The hinge points are designed to remain stable during actuation of the lens assembly 1 by means of the formations 39 within the retaining ring 6; when assembling the lens assembly 1, the rear cover plate 16, with the dish-shaped part 12 attached thereto, the diaphragm 24 and the supporting rings 2, 10 with the membrane 8 held between them are pre-assembled as a stack and then inserted into the retaining ring 6 and slid under the formations 39 at the hinge points Ⓗ1, Ⓗ2. The side wall 1 of the dish-shaped part 12 allows a small amount of movement, so that the support rings 2, 10 can move closer towards the bottom wall 19 of the dish-shaped part 18 to increase the pressure of the fluid within the cavity, which in turn causes the membrane 8 to distend forwardly towards the front cover plate 4, adopting a spherical (or other) shape as shown in FIG. 12, thereby to increase the focal power of the lens, as described above. Even though the membrane is non-round, it is able to adopt the desired spherical (or other shape) form by virtue of the construction of the supporting rings 2, 10.

The force applied to the one short side 7 of the supporting rings 2, 10 at the actuation point Ⓐ, in combination with the hydrostatic pressure applied to the membrane by the fluid within the cavity, causes the supporting rings 2, 10 to bend. FIG. 11 shows the supporting rings 2, 10 exhibiting a degree of bending upon application of the actuating force F. The supporting rings 2, 10 remain substantially stationary at the hinge points Ⓗ1, Ⓗ2 (although there is a degree of local tilting of the rings 2, 10 at these points). However, towards the middles of the long sides 3,5 of the assembly including points Ⓓ and Ⓔ, the rings flex forwards as described above, in an opposite direction to the force F, so that the supporting rings 2, 10 adopt a profile that would conform to the surface of a sphere (or other form) having same shape as the membrane 8. If the supporting rings 2, 10 were circular, they would remain planar when the membrane deforms spherically, but the non-round shape of the rings 2, 10 implies that they cannot remain flat when the membrane is distended, The ability of the supporting rings 2, 10 to flex in this manner and thus control the deformation of the membrane 8 to avoid unwanted distortions of the spherical or other shape is made possible by the predetermined variation in width of the supporting rings 2, 10 round their extent, and in particular in view of the fact that they are made narrower at the points where they are required to bend the most to adopt the desired profile. The predetermined variation in the width of the supporting rings 2, 10 produces a corresponding variation in cross-sectional area of the support rings 2, 10 and thus a corresponding predetermined variation of the second moment of area of the support rings. In particular the width of the supporting rings 2, 10 is continuously adjusted around the rings and reaches a minimum towards the middles of the long sides 3, 5 where the bending is thus greatest. In the absence of significant variation in other parameters, a difference in the second moment of area results in a difference in the bending stiffness.

As shown in FIGS. 10-12, the flexible membrane 8 is caused to bulge forwards in an opposite direction to that of the actuating three F. When the supporting rings 2, 10 are moved closer to the rear of the cavity at the actuation point Ⓐ, the liquid 11, being essentially incompressible, is forced to occupy a more central region of the cavity 22, owing to the elasticity of the membrane 8, thus increasing the curvature of the optical surface defined by the membrane 8 and the optical thickness of the cavity between the membrane 8 and the rear supporting plate 16 at the optical centre OC of the assembly, thus producing a higher power lens. Specifically, the deformation of the flexible membrane 8 is centred on the point OC as shown in FIG. 10 which thus forts the vertex of the lens.

In prior art fluid-filled lenses, in order to ensure spherical bulging of the membrane, the membrane is held by a supporting structure that is stiff and circular, so that only a circular portion of the membrane is unconstrained and can bulge forwards upon increasing the pressure of fluid. In some lenses (see e.g. GB 2353606 A) this is achieved by making the entire lens assembly circular in shape. In other lenses such for example as the one disclosed in WO 95/27912, the supporting structure comprises a stiff border around a circular central aperture where the membrane can bulge forwards. In WO 95/27912 the border is wide and bulky in places, which is aesthetically undesirable. By contrast in the present invention, whilst the short sides 7, 9 of the supporting rings 2, 10 are somewhat wider than the long sides 3, 5, as can be seen from FIG. 9, they are still relatively narrow in comparison with the area of the lens. Thus from an aesthetic point of view, spherical (or other) deformation of the membrane 8 is achieved without any significant adverse impact on the appearance of the lens assembly 1, which has a non-circular shape and relatively thin edges.

Upon actuation, when the flexible membrane 8 bulges forwards as shown in FIGS. 10 and 11, the amount of fluid 11 held in the cavity 22 remains constant, but because the membrane 8 changes in shape from a relatively flat profile to the distended profile shown, some of the transparent oil is displaced into the central, area of the lens. The displacement of the oil causes the membrane to adopt the actuated shape, thus increasing the power of the lens. The fluid 11 is sealed within the cavity 22 by the membrane 8, the diaphragm 24 and the dish-shaped part 12.

It will be understood by those skilled in the art that the spherical deformation of the supporting rings 2, 10 and of the flexible membrane 8 that is depicted in FIG. 10 is provided by way of example only to illustrate the change in shape of the various parts of the assembly 1, and that the deformation provided by the assembly of the invention may vary from that shown. In particular for any given lens assembly 1, the membrane 8 is continuously deformable between its un-actuated position, in which it is planar, and a fully distended position, as determined by the actual configuration and properties of the materials used for the assembly 1. In each position between the un-actuated position which provides no optical power and the fully distended position, the hinge points (H)1, (H)2 on the supporting rings 2, 10 remain essentially stationary and at least a major portion or portions of the supporting rings 2, 10, including the hinge points (H)1, (H)2, adopt a spherical (or other form) profile.

The actual variation in width of the support rings 2, 10 that is required to obtain the predetermined variation in bending moment round the rings, as described above, may be calculated by Finite Element Analysis (FEA). For quasi-static or low frequency optical and other applications, static FEA should be employed adequately. However, where the surface is intended for acoustic applications, dynamic FEA is appropriate. As those skilled in the art will be aware, FEA—whether static or dynamic—involves numerous iterations performed using a computer with the input of selected parameters to calculate the membrane shape that would result in practice with an increasing force F applied at the actuation point(s). The element shape is selected to suit the calculation being performed. For the design of the rings 2, 10 of the present invention, a tetrahedral element shape has been found to be suitable. The selected parameters to be input include the geometry of the supporting rings 2, 10, the geometry of the membrane 8, the modulus of the membrane 8, the modulus of the rings 2, 10, including how the modulus of the rings varies round the rings (which may be defined empirically or by means of a suitable formula), the amount of pre-tension in any of the parts, the temperature and other environmental factors. The FEA programme defines how the pressure applied to the membrane 8 increases as load is applied to the rings at the actuation point (A).

An example FEA analysis output for a supporting ring is shown in FIG. 13. The greyscale shows the degree of displacement of the membrane 8 away from its planar un-actuated configuration; contours of displacement are superimposed on the greyscale. The membrane shows maximal forwards deformation in its central region and maximal rearwards deformation (in the direction of the applied force F) at the actuation point (A), with circular contours proving essentially spherical deformation. This figure shows the deformation in 2-dimensions; it will be understood however that this corresponds to 3D spherical deformation in practice. The first lens assembly 1 of the invention achieves a substantially undistorted spherical lens, centred on the point OC. It can be seen from FIG. 13 that the point OC is different from the observed geometric centre of the lens 1, which is shown by the point where the vertical and horizontal lines cross. This FEA output is referred to as the "first FEA output" below.

In order to design precisely the rings 2, 10 for optical use, the output of the FEA analysis may be approximated to the desired shape of the membrane as defined by a polynomial function. In general terms, the shape of an optical surface may described by one or more Zernike polynomial functions. These have the general formula $Z_n^{\pm m}$. Various shapes, as defined by Zernike functions or combinations of more than one such function, are possible using the present invention. An explanation of the various Zernike polynomials can be found in Principles of Optics[1]

[1] "Principles of Optics" M. Born and E. Wolf, 7$^{th}$ Ed, C.U.P., (1999). ISBN 0-521-64222-1

A priority for ophthalmic applications, for instance, is to be able to achieve vision correction with a linear superposition of $Z_2^{\pm 2}$ (astigmatism) and $Z_2^0$ (sphere for distance correction). Opticians typically prescribe lenses based on these formulae. Higher order surfaces with additional components $Z_j^{\pm j}$ are also possible in accordance with the present invention if additional control points (as described below) are provided on the edge of the membrane, where j scales in similar magnitude to the number of control points. Higher order surfaces with components $Z_j^{\pm k}$ (k≤j) may also be possible where the shape of the membrane edge permits.

Variants of the first lens assembly 1 of the invention are able to produce static membrane shapes corresponding to any such polynomial for which j=k. Various complex surfaces are known to be possible and useful for certain applications. For example, laser vision correction surgery often works to certain higher order functions, and thus alternative embodiments of the lens assembly of the invention might be used as an alternative to laser surgery. Various linear superpositions of scaled Zernike polynomials of the form $Z_n^{\pm m}$ are possible:

$$Z_2^{\pm 2}, Z_2^0, Z_j^{\pm j}, Z_j^{\pm k}(k \leq j)$$

In general, except at their periphery, surfaces achievable by deforming a membrane with pressure may have one or more local maxima or one or more local minima, but not both, in addition to saddle points. The shapes that are achievable are necessarily limited by the shape of the periphery, which is stable in use.

In some embodiments of the lens assembly of the present invention, a spherical Zernike function may be used, but higher spherical order functions can also be used if desired, by creating a shape that is the sum of a number of Zernike polynomials.

The first FEA output is then correlated with the desired Zernike function across the membrane ("second polynomial output") to see how well the first FEA output approximates to the desired shaped as defined by the chosen Zernike function. Depending how well the first FEA and second polynomial outputs correlate with one another, the relevant parameters of the lens can be adjusted to achieve a better fit on the next iteration. In other words, by seeing how well the simulated deformation of the membrane 8, as calculated by FEA, approximates to the desired surface shape as described by the selected Zernike polynomial function, one can see how well the chosen supporting ring 2, 10 parameters perform. It is possible to determine which regions of the supporting rings 2, 10 need to be tuned (or which other parameters should be adjusted) to improve the correlation of the first and second outputs.

The above-described iterative process is carried out over a number of different lens powers so that a lens whose power varies continuously with deformation of the supporting rings 2, 10 (and the force F applied) can be designed. This iterative process has been carried out to achieve a number of working embodiments of the supporting rings 2, 10 in accordance with the invention. Thus the supporting rings 2, 10 are designed to bend variably round their extent and with respect to the adjustment in lens power required. The variation in width of the supporting rings 2, 10 in the x-y plane, perpendicular to the optical z-axis of the lens, round their extent can also be adjusted for different lens shapes, taking into account the locations of the hinge points (H)1, (H)2 and actuation point relative to the desired optical centre OC.

Figure 14:
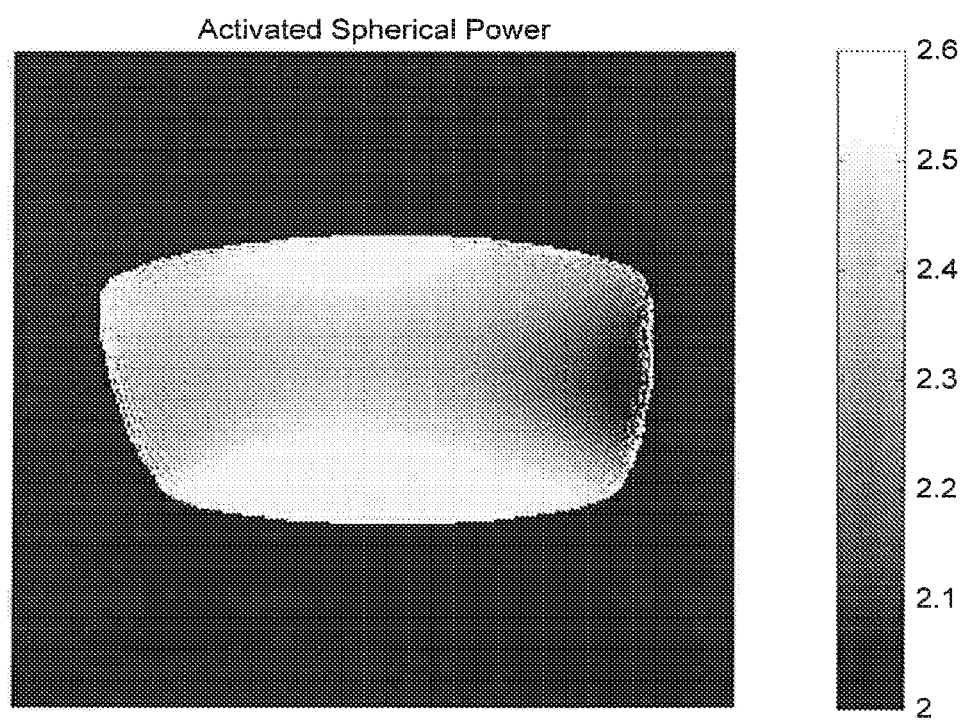
FIG. 14 shows the uniformity of the optical power of the first lens assembly in an actuated state, as calculated by FEA.

Once the shape of the membrane 8 has been calculated by FEA as described above, the optical properties of the membrane as an optical lens surface may be determined by suitable optical ray tracing software (e.g. Zemax™ optical software available from Radiant Zemax, LLC of Redmond, Wash.) using the calculated membrane shape. By way of example, FIG. 14 shows how the spherical lens power varies across the membrane 8 of the first lens assembly 1 when distended, the distended shape being calculated by static FEA. The darkest areas show the greatest lens power, and as can be seen from FIG. 14, the inflated membrane 8 produces a lens surface which has a satisfactorily uniform spherical lens power.

In view of the fact that the degree of deformation of the flexible membrane 8 can be adjusted smoothly through a range, the lens assembly of the invention represents a significant improvement over conventional bifocal lenses, where the wearer needs to glance downwards to look through the near-vision lens. By using the lens assembly 1 of the present invention, the lens power can be adjusted on demand for near vision and occurs in an optimal region of the lens, namely in the region of the optical centre. The lens assembly is thus usable for viewing a near object without the need to adjust head position or the direction of gaze.

Figure 15:
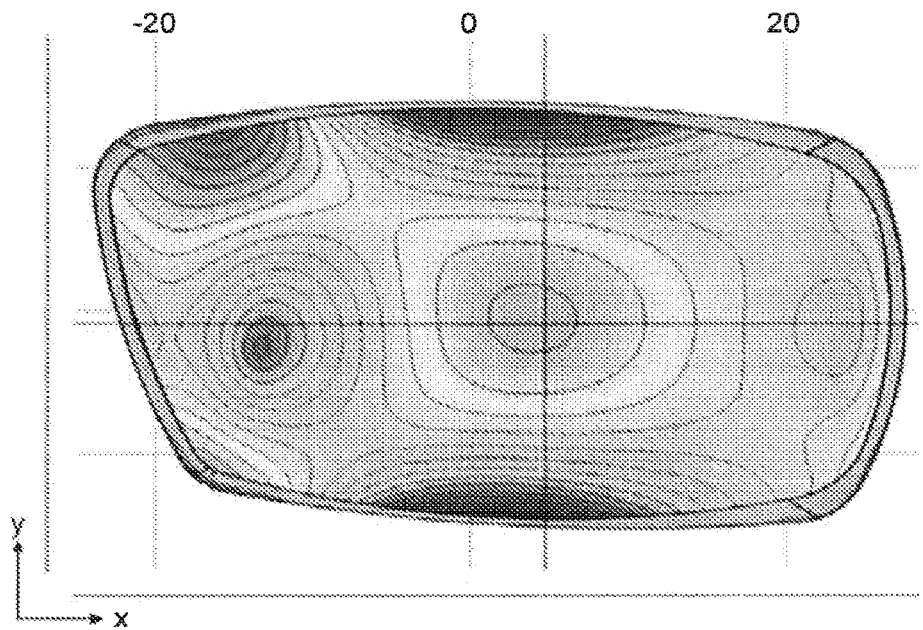
FIG. 15 shows the variation of pre-tension in the membrane as calculated by FEA of a lens assembly in the un-actuated state that is similar to the first lens assembly but omits the reinforcing diaphragm.
Figure 16:
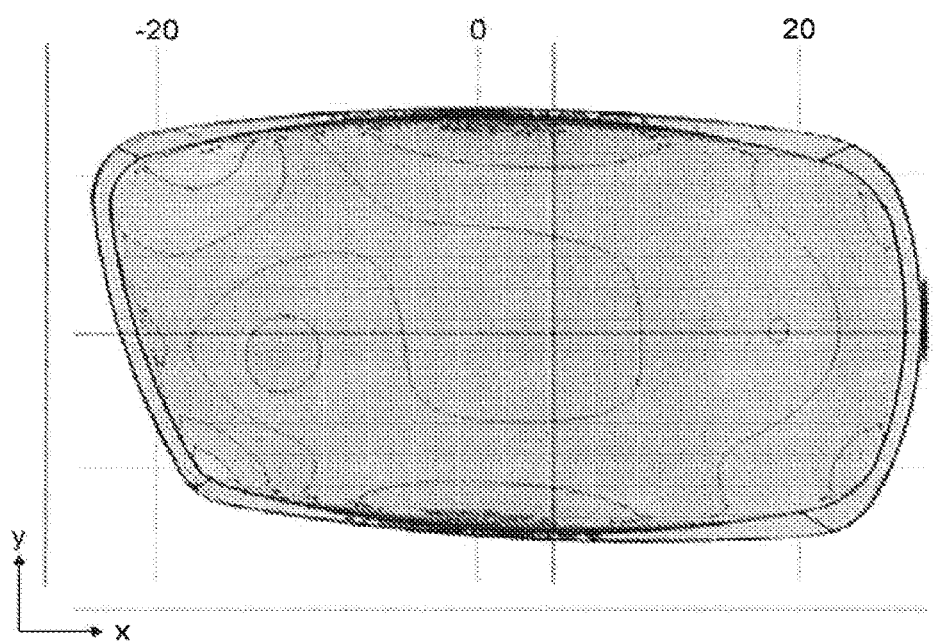
FIG. 16 shows the variation of pre-tension in the membrane as calculated by FEA of the first lens assembly of the invention in the un-actuated state.

FIGS. 15 and 16 show sample FEA outputs from designing the membrane reinforcing diaphragm 24. FIG. 15 shows the pre-tension across the flexible membrane calculated by FEA in a lens assembly in accordance with the invention that is similar to the first lens assembly 1 described above, but which omits the diaphragm 24, with the membrane un-actuated. The greyscale reveals significant variation in the pre-tension in the membrane, with several regions of relatively greater tension and several regions of relatively lower tension; the tension in the membrane is noticeably uneven.

FIG. 16 shows the corresponding FEA output for the first lens assembly 1 which includes the diaphragm 24. In this assembly 1 the membrane 8 exhibits significantly less variation in pre-tension when un-actuated than the one of FIG. 15. Over its area, the membrane of FIG. 15 displays a 30% variation in pre-tension while the membrane of FIG. 16 has only an 8% variation.

FIGS. 17 and 18 show the calculated spherical lens powers for the first lens assembly 1 and for the similar lens assembly in which the diaphragm 24 is omitted. Again, it can be seen that the variation in optical spherical power is much less in FIG. 18; the greyscale shows much greater uniformity.

The reinforcing diaphragm 24 thus provides significant benefits in improving the uniformity of the pre-tension in the membrane when un-actuated and the optical spherical power of the membrane when distended, i.e. actuated, that are independent of the shape of the membrane. Effectively the diaphragm 24 increases the stiffness of the supporting rings 2, 10 in the x-y plane defined by them without significantly affecting the stiffness of the rings transverse to the plane in the z-axis. As noted above, the reinforcing diaphragm 24 of the invention may be advantageously used for this purpose in any fluid filled assembly with a pre-tensioned flexible membrane of a controllable shape forming a wall of the cavity, such as an optical surface of a fluid-filled lens, regardless of the outline shape of the membrane. The diaphragm 24 may therefore also be used in round fluid-filled lens, for example.

FIGS. 19 and 20 show schematically the mode of actuation of the first lens assembly 1. The lens assembly 1 is actuated by "angled compression". The front and rear plates 4, 16, the retaining ring 6, the diaphragm 24 and other detailed features are omitted for clarity.

FIGS. 19A and 20A show the lens assembly 1 in its un-actuated state. In this condition, the membrane 8 is flat.

In FIGS. 19B and 20B, the lens assembly 1 is actuated to increase its optical power by the application of a force F applied to the one side 7 of the supporting rings 2, 10 at the actuation point (A) in a direction to urge the supporting rings 2, 10 towards the rear wall 19 of the dish-shaped part 12. The rear wall 19 of the dish-shaped part is held stationary and thus supported by the rear cover plate 16 and retaining ring 6 (not shown in FIG. 19B). This causes the one side 7 of the supporting rings 2, 10 to move closer to the rear wall 19 of the dish-shaped part 12. The other short side 9 of the supporting rings 2, 10 is anchored at the hinge points (H)1, (H)2 by the formations 39. The supporting rings 2, 10 thus tilt rearwardly under the influence of the force F to subtend an acute angle with the rear wall 19. This tilting movement, which is exaggerated in FIG. 19B, is accommodated by the flexible seal formed by the side wall 18 of the dish-shaped part 12. As a result of this squeezing together of the supporting rings 2, 10 and the rear wall 19 of the part 12, the hydrostatic pressure within the cavity increases, causing the membrane 8 to become distended, flexing convexly outwardly as shown.

In FIGS. 19C and 20C, the actuation force is removed which allows the supporting rings 2, 10 to return to their un-actuated, relaxed state as a result of their intrinsic resilience. The side wall 18 of the dish-shaped part 12 is thus caused or allowed to uncompress, relieving the hydrostatic pressure within the cavity. In turn, the membrane 8 is allowed to return to its un-distended un-actuated position.

The lens assembly 1 hereinbefore described operates by tilting the rings 2, 10 towards the rear wall 19 of the dish-shaped member 12 to reduce the volume of the cavity 22 and thereby to increase the pressure of the fluid 11, causing the membrane 8 to distend outwardly. However those skilled in the art will appreciate that the same principles may be applied to a membrane assembly in which the membrane supporting ring(s) are tilted or otherwise moved away from the rear wall to increase the volume of the cavity and thereby reduce the pressure of the fluid, resulting in the membrane caving inwardly. The shape of such a concave membrane may be controlled in an analogous manner by providing a ring or rings having a variable second moment of area such that upon deformation of the membrane the ring or rings adopt the profile needed to produce the desired predefined form in the membrane.

FIGS. 21 and 22 show a second lens assembly 101 according to the invention. Each of FIGS. 21A-C shows a cross-sectional view of the second lens assembly 101 at a different state of actuation, and FIGS. 22A-C show corresponding front elevations.

The construction of the second lens assembly 101 is similar to that of lens assembly 1; parts of the second lens assembly 101 that are the same as or similar to those of the first lens assembly 1 are not described again below, but are referred to by reference numerals that are the same as the reference numerals for the corresponding parts of the first lens assembly 1 but increased by 100.

The second lens assembly 101 has a square shape. While the first tens assembly 1 uses "angled compression" of the fluid cavity 22 for actuation, the second lens assembly 101 uses "cushion" (or uniform) compression as described below.

FIGS. 21A and 22A show the un-actuated state of the second lens assembly 101 in accordance with the invention.

In FIGS. 21B and 22B, the second lens assembly 101 is shown in an actuated state to increase its optical power. However, instead of tilting the supporting rings relative to the rear wall of the dish-shaped part 112 by applying a force to one side of the assembly to tilt the rings about hinge points on an opposite side, the supporting rings 102, 110 of the second lens assembly 101 are pushed at a plurality of actuation points Ⓐ that are spaced round the rings, so that at each actuation point the rings are displaced relative to the support afforded by the frame 92 towards the rear wall 119 by a predetermined distance according to the desired membrane shape. That is, at each actuation point, the rings 102, 110 are displaced according to the desired locus of displacement of the rings at those points to achieve the desired membrane shape. The precise location of the actuation points and the amount of their displacement will depend on the outline shape of the membrane 108, but in general according to the invention an actuation point should be situated at each point on the rings where the displacement is a local maximum. Thus in the second lens assembly 101, an actuation point Ⓐ is situated at each corner 121 of the membrane 108, and each actuation point Ⓐ is displaced by the same amount as the assembly 101 is actuated as the other points.

Intermediate the corners 121 of the membrane 108, the square outline shape of the membrane means that it deviates inwardly from a round configuration. This means that when the membrane is distended spherically, the sides 103, 105, 107, 109 of the membrane should be displaced in the z-direction by a smaller amount than the corners 121, so that the sides arch forwards between the corners 121, and may even be displaced forwards relative to the un-actuated position towards the centre of each side at points Ⓒ, Ⓓ, Ⓔ and Ⓕ to produce the required spherical profile.

In an alternative embodiment, the rings 102, 110 could be held stationary at the corners 121, e.g. by formations of the kind used in the first lens assembly 1 for the hinge points Ⓗ1, Ⓗ2, and an actuating force F applied uniformly to the rear cover plate 116 in the z-direction, as shown in FIG. 21B. A reaction force would then be applied to the rings at the substitute hinge points Ⓗ in the corners 121 where the rings are held.

Upon actuating the second lens assembly 101 as described above, the flexible side wall 118 of the dish-shaped part 112 is compressed uniformly, increasing the pressure of the fluid 111 within the cavity 122. This causes the membrane 108 to inflate and bulge outwardly in a convex manner. In spite of the square shape of the membrane, the width and thus bending modulus of the rings 102, 110 is varied round the membrane such that they deform in a controlled, predetermined manner, as calculated by FEA for instance, to maintain a spherical (or other preselected) profile, such that the membrane is caused to deform spherically (or according to the other preselected profile). Specifically, in the embodiment shown in FIGS. 21 and 22, the rings 102, 110 are thicker at the corners 121 than they are between the corners, allowing the rings intermediate the corners to flex forwardly relative to the corners in the manner described above.

In view of the even movement of the supporting rings 102, 110 towards the rear cover plate 116, a smaller total displacement of the supporting rings 102, 110 may be required to inflate the membrane 108 fully as compared with a similarly dimensioned "angled compression" assembly. Thus the thickness of the second lens assembly 101 may be minimised.

In order to return the second lens assembly 101 to the un-actuated state, the actuating force is removed from the actuation points Ⓐ (or from the rear cover plate as applicable) and the rings are allowed to return to the un-actuated starting position as shown in FIGS. 21C and 22C. In some embodiments, the resilience of the dish-shaped part 112 may be sufficient to restore the rings to the un-actuated state when the actuating force is removed. However, in a variant, the assembly may be actively returned to the un-actuated position by driving the rings 102,110 at the actuating points in the opposite direction or by holding the rings 102, 110 and apply a reverse force –F (see FIG. 21C) to the rear cover plate 116 to pull the plate away from the rings. The pressure of the fluid 111 within the cavity 122 is thus relieved, allowing the membrane and the rings to return to their planar configuration.

The first and second lens assemblies 1, 101 are similar to one another in that they both require application of a force to compress the assembly. The difference between them resides primarily in the number of actuation points Ⓐ and hinge points Ⓗ. In the first lens assembly 1 there is one actuation point Ⓐ on one short side 7 of the assembly and two hinge points Ⓗ1, Ⓗ2 on the other short side 9 that define a tilting axis. The long sides 3, 5 are unconstrained and are free to bow forwards as the cavity 22 is compressed. In the second lens assembly 101, there are no hinge points, but actuation points Ⓐ are provided at each corner 121 where maximal compression of the cavity 122 is required to achieve the desired membrane shape.

In general, the membrane assembly of the present invention utilises semi-active control of the shape of the supporting rings 2, 10; 102, 110 by actively controlling the position of the rings at a plurality of control points at spaced locations round the rings, which control points may be hinge points or actuation points, and allowing the rings 2, 10; 102, 110 to flex freely between the control points. An actuation point is a point at which the displacement of the rings is either actively controlled to achieve compression of the cavity 22; 122, or the displacement of the rings is modified by a passive element, a spring for example. A hinge point is a point where rings are held in a fixed position, but the rings are allowed to tilt if required to allow the cavity to be compressed by 'angled compression' such, for example, as in the first lens assembly 1. Those skilled in the art will appreciate that the region of the rings 2, 10; 102, 110 that is affected by a control point should be as small (localised) as possible, and adjacent control points should not, in general, be rigidly connected to each other, to allow the rings to flex along the rings as required to achieve the desired shape. Generally there must be at least three control points (hinge points or actuation points) in order to define stably the datum plane of the membrane 8.

There should be at least one control point within each sector of the rings 2, 10; 102, 110. By a "sector" is meant a region of the rings between two adjacent unsupported minimal points on the rings 2, 10; 102, 110 where the rings approach locally closest to the defined centre of the membrane 8; 108. At these minimal points, the displacement of the rings 2, 10; 102, 110 towards the rear wall 19 when actuated is a local minimum. In fact, in the embodiments described, the rings 2, 10; 102, 110 are actually displaced forwards, away from the rear wall 19 when actuated, and so in these embodiments the minimal points are actually points of local maximum displacement forwardly relative to the assembly.

The "centre" is the predefined centre of the desired distended shape of the membrane. In the case of a lens assembly, the centre may be the optical centre OC at the vertex of the inflated membrane. Within each sector, the control point should be positioned at or close to the maximal point at which the rings 2, 10; 102, 110 are disposed locally furthest away from the centre; in other words where displacement of the rings 2, 10; 102 rearwards towards the rear wall 19 is a local maximum in the actuated state. The rings 2, 10; 102, 110 should be unconstrained at points intermediate the control points, where the desired displacement of the rings 2, 10; 102, 110 towards the rear wall 19 is less than at the neighbouring control points, so that the edge of the membrane 8; 108 may arch forwardly relative to the positions it would have adopted if the rings were inflexible, except short lengths of the rings 2, 10; 102, 110 may be supported, e.g. by stiffening ribs such as stiffening ribs 3a, 3b, if the supported region of the rings 2, 10; 102, 110 does not significant deviate from a circular locus relative to the optical centre OC. However, the support for the rings should still allow some flexing of the rings, including in the direction along the rings to avoid unwanted distortions.

FIG. 23 shows how the distance between the optical centre OC and the rings 2, 10 varies in the first lens assembly 1 round the rings 2, 10. The units in FIG. 23 are arbitrary. It will be appreciated that if the membrane were round, then the plot-line would be flat. As shown in FIG. 10, the membrane 8 of the first lens assembly 1 defines two main sectors—S1, S2. Sectors S1 and S2 are each defined between two adjacent unsupported minimal points Ⓓ and Ⓔ which, as described above, are disposed approximately midway along the two long sides 3, 5 of the membrane 8. Sector S1 includes said other short side 9 and the maximal point Ⓗ1, while sector S2 includes the one short side 7 and the maximal points Ⓑ and Ⓒ. The actuation point Ⓐ is disposed intermediate the two maximal points Ⓑ and Ⓒ. In a perfect membrane assembly according to the invention, an actuation point would be provided at each of the maximal points Ⓑ and Ⓒ with point Ⓐ technically being a local minimal point, but for convenience and practicality, a single actuation is provided at point Ⓐ between points Ⓑ and Ⓒ. As best seen in FIG. 23, the distance from the rings 2, 10 to the optical centre OC of the membrane is generally constant between the two maximal points Ⓑ and Ⓒ, and while actuation point Ⓐ is technically a minimal point (a local minimum turning point), the displacement of the rings at point Ⓐ is still positive (Ⓐ is further from the optical centre than the hinge points Ⓗ1 and Ⓗ2) and, as a minimal point, it is insignificant in comparison with the major turning points Ⓔ and Ⓕ, and the stiffening rib 3a serves to support the rings 2, 10 between the adjacent maximal points Ⓑ and Ⓒ across the minimal point at Ⓐ and to distribute the load applied at the actuation point Ⓐ along the one short side 7 of the assembly.

Sector S1 also includes the hinge point Ⓗ2, which is not disposed at a maximum or minimal point, but helps to define the plane of the membrane for which at least three control points are needed. In the case of a membrane assembly that operates in the "angled compression" mode described above, e.g., the first lens assembly 1 of the invention, a hinge point can be used at any control point on the membrane supporting rings 2, 10 where the rings do not move (or do not move substantially) during actuation of the lens. The hinge points Ⓗ1, Ⓗ2 of the first lens assembly 1 are thus disposed within the same sector and define a tilting axis T (see FIG. 10) that is bisected substantially perpendicularly by an axis between the tilting axis T and the actuation point Ⓐ. The tilting axis T is also generally parallel to the short sides 7, 9 of the assembly. The optical centre OC is disposed between the tilting axis T and the actuation point Ⓐ. In some embodiments adjacent hinge points may be situated in adjacent sectors if there is a minimal point between them.

FIG. 24 shows how the distance between the optical centre OC and the rings 102, 110 varies in the second lens assembly 101 round the rings 102, 110. As can be seen there are four unsupported minimal points Ⓒ, Ⓓ, Ⓔ and Ⓕ, where the rings 102, 110 are disposed locally closest to the centre OC. The corners 121 of the assembly are furthest away from the centre OC, and so these comprise maximal points. An actuation point is placed at each corner 121, and the sides 103, 105, 107, 109 are left unconstrained. The four minimal points Ⓒ, Ⓓ, Ⓔ and Ⓕ define four sectors S1-S4, and a respective one of the actuation points Ⓐ is disposed within each sector. In the alternative embodiment where an actuating force F applied uniformly to the rear cover plate 116 in the z-direction, as shown in FIG. 21B, a hinge point Ⓗ may be placed in each corner 121, and this is possible because the effective displacement of the rings 102, 110 in each corner 121 is the same, so the effective displacement at each hinge point Ⓗ is the same.

It will be understood that the more control points that are provided, the more accurately the deformation of ale membrane can be controlled. Furthermore, additional actuation points facilitate improved control of the membrane surface and a wider set of possible lens shapes.

It will be understood by those skilled in the art, that if lens assemblies 1; 101 of the type described herein are used in a pair of eyeglasses, such as eyeglasses 90 of FIGS. 1 and 2, a selectively operable actuation mechanism should be provided to afford the necessary compression of the cavity 22, 122 and fluid pressure adjustment to operate the lens, either directly or indirectly. Such an actuation mechanism may be conveniently provided either in the bridge 94 or one or both of the temple arms 93. In some embodiments a separate actuation mechanism for each lens assembly 1; 101 may be provided in each arm 93, and the mechanisms linked electronically to provide simultaneous actuation of the two assemblies 1; 101. The actuation mechanism is not described herein, but in general terms may be mechanical, electronic, magnetic, automatic with eye or head movement, or involve use of a phase change material, such as shape memory alloy (SMA), wax, or an electroactive polymer. In the event that some passive control of the lens assembly 1; 101 is desired, the fluid pressure could be adjusted with a pump.

It will be appreciated that the use of separate front and rear supporting rings 2, 10; 102, 110 is not essential to achieve the basic functionality of the lens assembly 1; 101 of the present invention, and in some variants the membrane 8; 108 may be supported by a single flexible ring. However, it has been fund that the use of two or more supporting rings is advantageous for controlling for example the rate of twist in the supporting rings 2, 10, and particularly during manufacture of the assembly.

FIG. 25 illustrates the attachment of a flexible membrane 208 to a single membrane supporting ring 210 using an annular layer 254 of adhesive. It has been found that when a membrane 208 is attached to a single ring 210 with adhesive in this manner, the tension that is imparted to the membrane 208 causes the membrane 208 to exert a moment around the support ring 210 and pull on one face of the support ring 210 thereby tending to tilt the supporting ring 210 locally towards the centre of the lens, as shown in dotted lines in exaggerated form. This is undesirable because it means that the ring 210 does not sit squarely with the other components of the assembly and makes it more difficult to control bending of the ring 210. Such unwanted torsion in the ring 210 also gives rise to edge effects in the lens and the introduction of optical aberrations as a function of the lens power.

The present invention provides a solution to this problem by using two supporting rings 2, 10; 102, 110; 302, 310 (see FIG. 26). FIG. 26 shows an improved assembly method in which a flexible membrane 308 is held between the front and rear supporting rings 302, 310. In this improved method, the membrane 308 is pre-tensioned as before, but as well as applying a layer of adhesive 354 to a front face of a rear support ring 310, a layer of adhesive 356 is also applied to a rear face of a front supporting ring 302. This can be done simultaneously or sequentially. The two supporting rings 302, 310 are then brought together simultaneously on either face of the membrane 308 as shown to sandwich the membrane 308 therebetween. Since the flexible membrane 303 is never held on just one of the rings, the additional support provided by both rings 302, 310 at once balances any local torsional forces that would otherwise occur, therefore providing balanced support. The adhesive is then cured. Thus a substantially sandwich planar structure which holds the pre-tension in the membrane 308 is formed. Those skilled in the art will appreciate that more than two supporting rings can be employed if desired, provided that the membrane is sandwiched between supporting rings in such a way that the tension in the membrane is applied evenly to the rings on each side of the membrane to avoid unwanted torsional forces. Thus, for instance, two or more supporting rings may be provided on each side of the membrane.

Various embodiments and aspects of the present invention arc described above, all of which provide for controlled deformation of the flexible membrane 8, 108. In particular, described embodiments show how substantially spherical deformation, or deformation according to one or more Zernike polynomials or similar surface expansions, of the elastic membrane 8, 108 can be achieved. Optical distortion is minimised and the lens can be used to provide a smooth transition from long-distance to short-distance focus. Such controlled deformation has not been achieved by any prior non-round fluid filled lenses. It will be understood by those skilled in the art that deformation according to a Zernike polynomial is not essential, and the present invention can be used to control deformation of an elastic membrane 8, 108 to other desired shapes. The lens assembly of the invention can be used to correct various optical aberrations which may arise depending on the application. This can be achieved by design based on combinations of different Zernike functions.

In the first and second lens assemblies 1; 101 described above, the variation in stiffness of the membrane supporting rings 2, 10; 102, 110 round their extents is achieved by varying the width and hence the second moment of area of the supporting rings round the rings, while the depth of the rings in the z-direction remains substantially constant. This stiffness could be adjusted in different ways: for instance, instead of varying the width of the rings in the x-y plane, the depth of the rings in the z-direction could be adjusted. In another alternative, the ring or rings could comprise an assembly of multiple ring segments, each part being formed from a material of selected stiffness and the parts being joined end to end to form the ring. The use of different materials for different segments of the ring would thus allow the stiffness of the ring to be adjusted as desired round the ring. The ring segments could have the same or different lengths as needed; for instance shorter ring segments would be used in regions of the ring where the stiffness was required to vary more with distance. In yet another alternative, heat or chemical treatment of selected regions of the ring or rings could be used to alter their material properties. Yet another alternative would be to use a composite material for the ring or rings and to vary the properties of the material at selected locations round the ring(s) by altering the structure of the material, e.g. by changing the orientation of reinforcing fibres.

The first and second lens assemblies 1; 101 may suitably be installed in a pair of eyeglasses 90 such that the flexible membrane 8, 108 bulges forwards away from the wearer's eyes when actuated. This may be preferred for safety reasons, but it will be appreciated that the lens assemblies 1; 101 could equally well be installed in eyeglasses so that the membrane bulges towards the user's eyes.

In the first and second lens assemblies 1; 101 the cavity 22; 122 is defined in part, by the dish-shaped part 12; 112, the rear wall 19; 119 of which is attached to the rear cover plate 16; 116. In a variant, the dish-shaped part 12; 112 may be omitted, and replaced by a flexible sealing ring (not shown) which is similar to the side wall 18; 118 alone of the dish-shaped part and forms a seal between the rear cover plate 16; 116 and the rear supporting ring 10; 110 (or the reinforcing diaphragm 24 if included).

It should also be noted that a fixed prescription lens (for distance or near vision) could be included in the lens assembly 1; 101 of the invention. This could be achieved by using a fixed power lens as the front cover plate 4; 104 and/or as the rear cover plate 16; 116. Such a fixed power lens should have an optical centre that is closely aligned with the optical centre of the adjustable lens OC when actuated.

The adjustable lens assembly 1; 101 of the present invention as hereinbefore described is capable of providing a variation in optical power from −8 to +4 dioptres. If a negative lens power is required, the flexible membrane 8; 108 should be arranged to flex inwardly to achieve this.

The present invention may also be used for controlling the deformation of a surface in other fields such, for example, as acoustics. By rapidly oscillating the applied force, F, oscillating pressure waves will be generated in a fluid placed in contact with the membrane. Since the deformation of the membrane can be controlled to be spherical in accordance with the invention, such pressure waves will appear to have originated from a point source. This ensures that the waves do not exhibit undesirable interference patterns, whilst allowing a loudspeaker (for instance) incorporating the membrane as the transducer to be non-round in form, thus allowing it to be packaged within a confined space, for example in a television or mobile phone. In general terms, the above described principles can be applied to any application in which the geometry of a surface needs to be controllably varied.

What is claimed is:

1. A variable focal length lens assembly comprising:
   a fixed support;
   a transparent fluid-filled envelope forming a lens having an optical axis (z), the envelope having a wall which is formed by an elastic membrane that provides an optical surface of variable curvature and has a peripheral edge;
   a bendable supporting member that holds the elastic membrane around its peripheral edge, the supporting member being connected to the fixed support at three or more control points and being free to bend intermediate the control points in a direction substantially parallel to the optical axis; wherein the control points are selected from actuation points where the supporting member can be displaced relative to the fixed support in a direction substantially parallel to the optical axis and hinge points where the supporting member is restrained from displacement relative to the fixed support in a direction substantially parallel to the optical axis; wherein at least one of the control points is an actuation point;
   a selectively operable actuator that is arranged to act between the bendable supporting member and the fixed support for actively displacing the supporting member relative to the fixed support at the at least one actuation point to cause the membrane to distend inwards and/or outwards relative to the fluid-filled envelope; wherein an actuating or reaction force acts on the supporting member at each control point; and
   wherein the control points serve to control the shape of the bendable supporting member such that the supporting member has a profile that corresponds to a predefined 3-dimensional form of the membrane when distended; there being a control point at or proximate each point on the supporting member where the profile of the supporting member corresponding to the predefined form of the membrane has a turning point in the direction of the force acting on the supporting member at the control point between two adjacent points where the profile of the supporting member has an inflection point or a turning point in the opposite direction.

2. The lens assembly as claimed in claim 1, wherein the forces on the supporting member at the control points all act in the same direction parallel to the optical axis.

3. The lens membrane assembly as claimed in claim 1, wherein the actuator is configured for compressing the envelope.

4. The lens assembly as claimed in claim 3, wherein a control point is disposed at or proximate each point on the supporting member where the profile of the supporting member exhibits a local maximum displacement in the inwards direction relative to the envelope, intermediate two adjacent points on the supporting member where the profile of the supporting member exhibits a local minimum displacement in the inwards direction.

5. The lens assembly as claimed in claim 1, wherein the actuator is configured for expanding the envelope.

6. The lens assembly as claimed in claim 1, wherein the predefined form of the membrane is spherical or a form defined by one or more Zernike polynomials $Z_j^{\pm K}$ ($k \leq j$).

7. The lens assembly as claimed in claim 1, wherein the control points include a plurality of actuation points where the supporting member is actively displaced relative to the support.

8. The lens assembly as claimed in claim 7, wherein the membrane is continuously adjustable between an un-actuated state, and fully deformed state, and at each position between the un-actuated and fully deformed states the supporting member is displaced at each actuation point by a respective distance required to achieve the predefined form of the membrane.

9. The lens assembly as claimed in claim 8, wherein the supporting member is formed with a protruding tab at each actuation point for engaging the actuator.

10. The lens assembly as claimed in claim 1, wherein the control points include at least one hinge point where the supporting member where the supporting member is restrained from displacement relative to the fixed support in a direction substantially parallel to the optical axis.

11. The lens assembly as claimed in claim 10, wherein the membrane is continuously adjustable between an un-actuated state and fully deformed state and at each position between the un-actuated and fully deformed states the supporting member is held against displacement relative to the fixed support in a direction substantially parallel to the optical axis at the at least one hinge point to achieve the predefined form of the membrane at each position.

12. The lens assembly as claimed in claim 1, wherein the supporting member is generally rectangular, having two short sides and two long sides; the at least one actuation point being located on one of the short sides.

13. The lens assembly as claimed in claim 12, wherein the predefined form has a centre, the one short side generally follows the arc of a circle that is centred on the centre, and the at least one actuation point is located substantially centrally on said one short side.

14. The lens assembly as claimed in claim 10, wherein said predefined form has a centre and there are a plurality of hinge points that are substantially equidistant from the centre of the predefined form.

* * * * *